United States Patent [19]
Fan

[11] Patent Number: 5,926,168
[45] Date of Patent: Jul. 20, 1999

[54] REMOTE POINTERS FOR INTERACTIVE TELEVISIONS

[76] Inventor: Nong-qiang Fan, 1116 Banks #20, Houston, Tex. 77006

[21] Appl. No.: 08/523,283

[22] Filed: Sep. 5, 1995

Related U.S. Application Data

[63] Continuation-in-part of application No. 08/315,703, Sep. 30, 1994.

[51] Int. Cl.$^6$ ...................................................... G09G 5/08
[52] U.S. Cl. ............................................ 345/158; 348/734
[58] Field of Search .................................. 345/158, 157; 250/200; 348/734

[56] References Cited

U.S. PATENT DOCUMENTS

| | | | |
|---|---|---|---|
| 4,680,012 | 7/1987 | Morley et al. | 434/22 |
| 4,923,401 | 5/1990 | Marshall | 434/22 |
| 5,138,304 | 8/1992 | Bronson | 340/707 |
| 5,340,115 | 8/1994 | Shirai | 273/310 |
| 5,366,299 | 11/1994 | Suzuki | 273/310 |
| 5,401,025 | 3/1995 | Smith | 273/148 D |
| 5,517,257 | 5/1996 | Hashimoto et al. | 348/734 |
| 5,523,800 | 6/1996 | Dudek | 348/734 |
| 5,554,980 | 9/1996 | Vernace et al. | 348/734 |
| 5,648,824 | 7/1997 | Dunn et al. | 348/734 |
| 5,650,831 | 7/1997 | Farwell | 348/734 |
| 5,652,630 | 7/1997 | Bertram et al. | 348/734 |
| 5,724,106 | 3/1998 | Autry et al. | 348/734 |
| 5,737,028 | 4/1998 | Bertram et al. | 348/734 |

*Primary Examiner*—Richard A. Hjerpe
*Assistant Examiner*—Ronald Laneau

[57] ABSTRACT

A pointing device that enable an user to remotely control the position of a cursor (10) on the display means (20) of a computer or interactive TV (30) is disclosed. The cursor (10) on the display means (20) appears at the position pointed by the remote pointing device. The remote pointing device comprising a microprocessor based machine (30), display means (20), a cursor (10), pointing means (40), means for determining the position on the display means (20) pointed by the pointing means (40), and means for inputting into the microprocessor based machine (30) the position on the display means (20) pointed by the pointing means (40) as the position of the cursor (10). Two optical embodiments are described: the first one uses imaging devices (1150) and the second one uses light scopes (1400). Interactive monitors (1500) with capability of displaying invisible images and the methods of using the same are also described. Improved light scope (1400) are described as well. Among the six applications of the pointing devices, two applications are important for interactive televisions: the first application is to use the pointing device to make the ultimate remote control (1005) with one or two buttons (1010 and 1020), and the second application is to improve a conventional remote control (1000) by adding a pointing means (40) thereon.

1 Claim, 35 Drawing Sheets

REMOTE POINTERS FOR INTERACTIVE TELEVISIONS

This is a continuation-in-part of application Ser. No. 08/315,703 filed Sep. 30, 1994.

This invention is related to computer user interface, and specially to a device that can remotely control the cursor position on the display of a computer or interactive TV.

BACKGROUND OF THE INVENTION

With the advance of modern computers and telecommunication technology and with the rapid development of the information superhighway, computers and TVs are moving closer and closer, and brand new home electronics are emerging, combining the features of multimedia computers with other devices such as TVs, VCRs, CD players, telephones and fax machines.

The most cited example of these new home electronics is the interactive TV, which can be used for ordering videos on-line, doing home shopping and playing interactive games or sports. The combination of computers and TVs also requires a combination of the two different kinds of user interface used on these two kinds of machines. Computers use keyboards and mice as input devices, but TVs use remote controls as input devices. The reason for these different input devices is partially due to the different user habit on these two kinds of machines. A computer user is usually within one or two feet to the display screen, but a TV user is usually some feet away from the display screen. An interactive TV requires a input device which is good both for a computer and for a TV. The input device must have remote control capability and the capability of manipulating a cursor position. The importance of new and good input devices for interactive TVs has been long recognized by people in interactive TV industry, as descried in the article by Thomas E. Weber, p. R10, Mar. 21, 1994, *Wall Street Journal*. The major problem with the current remote controls is that they are becoming more and more complicate, and less and less user-friendly. The ultimate remote control should be based on Graphic User Interface (GUI) like that on a Macintosh computer with remote cursor manipulating functions and a few buttons working like that on a mouse.

At present, there have been two general approaches to design the input devices for interactive TVs: (1) to make computer mice work at a remote distance and (2) to add cursor control capability to the conventional remote controls for TVs. The first approach include remote mice, remote track balls, remote joysticks, and "air mouse" such as Sony's Egg and Creative Labs' AeroMouse or AeroPen. The second approach include remote control with cursor keys such as the remote control for Philip's CD-i, and the cursor keys have been improved from four directions to twelve directions, or even to continues in directions with cursor disks. The coding signals for these remote input devices have been either in infrared or in electromagnetic waves.

All the above mentioned input devices can perform the basic functions of an interactive TV, such as moving a cursor and clicking on an icon or manual. However, all these devices have one common disadvantage: the cursor position can not be controlled intuitively, comfortably or conveniently by the standard of average home users. It is therefore imperative to invent a new and better input device that provide the comfort and convenience.

The rather easy way to make the better input device is to make a remote pointing device that is directly related to the cursor position: where the remote pointing device pointed at is where the cursor position is.

SUMMARY OF THE INVENTION

It is an object of the invention to provide a remote pointing device that controls the cursor position on a display directly and provides intuitive graphic user interface for the new generation of microprocessor based home electronics such as interactive TVs. With the remote pointing device, the position the user pointed at is the position of the cursor.

It is a further object of the invention to provide a simplified remote control to replace the mouse as the input device for computers or interactive TVs. The simplified remote control consists of a remote pointing device, and a small number of control buttons like that on a mouse. The remote pointing device on the simplified remote control enables a user to directly position a cursor on a screen by simply pointing at the position. And based on the graphic user interface displayed on screens, the simplified remote control enables an user to interact effectively with computers and interactive TVs, by using a few buttons and simple actions like "point and click". The ultimate remote control described in this invention can have as few as two buttons—a power button and a select button.

It is a further object of the invention to improve conventional remote controls used for one way TVs and home electronics. A conventional remote control is improved by adding a remote pointing device to the existing device. This improvement enables an user to control cursor positions more easily than using the cursor keys found on conventional remote controls. The user only need to point at where he or she want the cursor to be, and instantaneously the cursor is there.

It is a further object of the invention to provide a remote pointing device that can be beneficial to the handicapped. By fixing a remote pointing device on a helmet or on a pair of glasses, an handicapped people can control a computer by simple head movement. Head controlled remote pointer devices can be used by astronauts or other workers to interact with computers with their head in a situation that their hands are occupied for their task. The straightforward extension of this usage is a body controlled remote pointing device.

It is a further object of the invention to provide a pointing device that can replace the mouse as the standard input device for desk top computers. With the recent development of WWW and Mosaic browser, computer users becoming increasingly depend on a comfortable pointing input device to surf on the Internet. Since in net surfing applications, a user spend most of the time manipulating the cursor, therefore, the user will want to have a pointing device which is more efficient and effective than a mouse in manipulating cursors. An user also want to have a more ergomatic pointing device which allow the user to free his hand from a desk top and lay back comfortably in a chair and still be able to control a computer effectively. A remote pointer with a few selection buttons can provide such an ergomatic pointing device for the computer users in the interactive age. The remote pointer can be either wireless or connected with a computer through a cable.

It is a further object of the invention to provide a remote touch screen based on a remote pointer. In a conventional touch screen, the computer command is issued by fingers or other object touching the screen. In a remote touch screen, a visible light beam is used as an extension of fingers, and is used to touch a screen, with the touching action issued by selection buttons on a remote pointer.

It is a further object of the invention to make a pointing device that can be used in game applications, such as, simulation of a game gun which shoot at computer screen. There are already several pointing mechanisms developed for video gun applications, such as light scopes. These mechanisms can be modified and adept to become the operating mechanism of the present remote pointer, by continuously displaying a cursor and by adding one or several selection buttons like that on a mouse. Alternatively, present invention of remote pointer can also be modified for game applications, and be more cost effective.

It is a further object of the invention to make the remote pointing device non obtrusive and cost effective. The invention is targeted at the home market, but it can also be used in the education and business market. The remote pointing device is mainly for the interactive TVs, but it can also be used in classroom or in business by pointing the device at a large display for classroom instruction or business presentation.

Additional advantages and novel features of the invention will be set forth in the description which follows, and in part will become apparent to those skilled in the art upon examination of the following, or may be learned by practice of the invention. The objects and advantages of the invention maybe realized and attained by means of the instrumentality and combinations particularly pointed out in the appended claims.

To achieve the foregoing and other objects and in accordance with the present invention, as described and broadly claimed herein, pointing means is provided to point at display means of a computer or interactive TV, the position on the display means pointed by the pointing means is found and inputted into the computer or interactive TV as the cursor position, so that an user can easily and intuitively control the cursor position.

BRIEF DESCRIPTION OF THE DRAWINGS

The accompany drawings, which are incorporated in and form a part of the invention and, together with the description, serve to explain the principles of the invention. In the drawings, closely related figures have the same number but different alphabetic suffixes.

FIG. 11b shows an improved remote control with pointing means.

DESCRIPTION OF THE INVENTION

Figure 1:
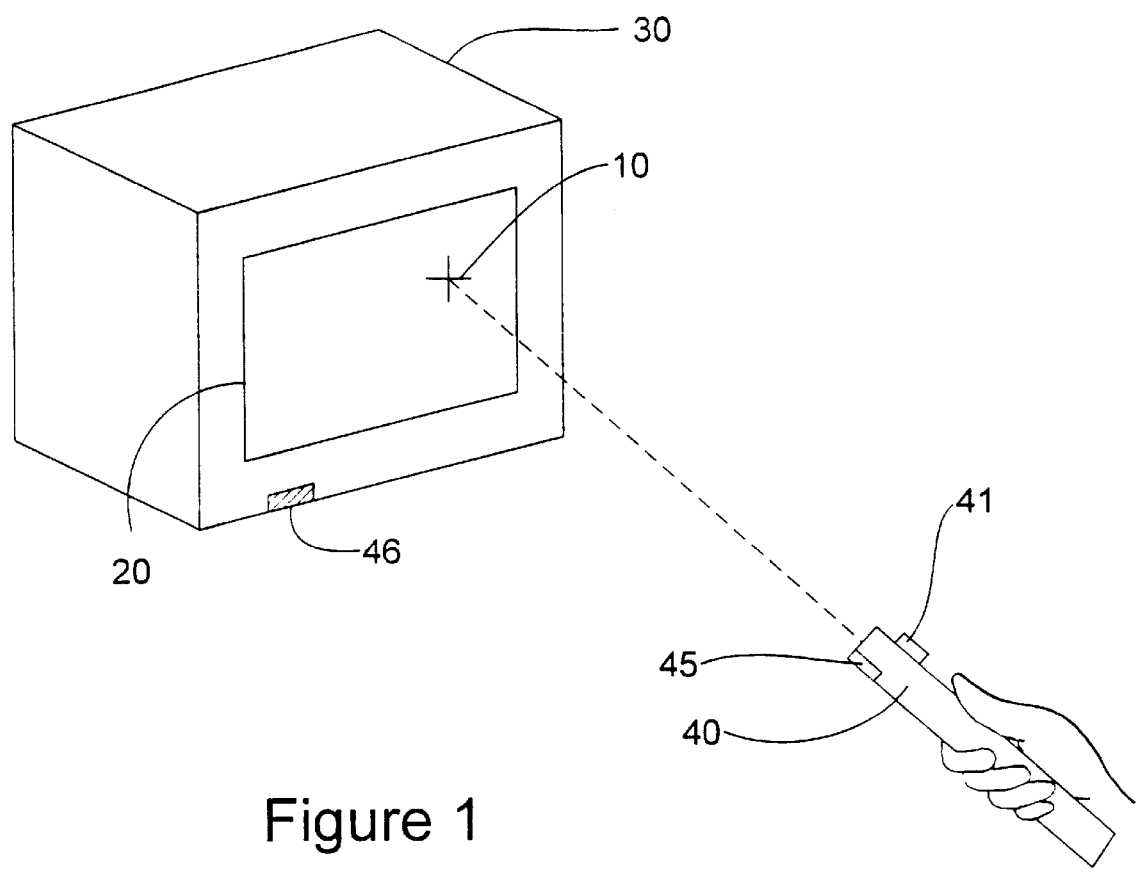
FIG. 1 shows the cursor position on display means of a microprocessor based machine is controlled remotely by pointing means.

FIG. 1 illustrates the configuration and the operation of a remote pointing device. As shown in FIG. 1, a microprocessor based machine 30 has display means 20. The microprocessor based machine 30 can either be a computer or an interactive TV. The display means can either be a CRT display, a plat panel display, or a large projection screen on which display image is projected by a LCD projection device. There is a cursor 10 on the display means 20. The display means 20 displays graphic images which provide the basics for the Graphic User Interface(GUI). There are icons, pull down manuals, pop up manuals, scroll balls and other graphic images on the display means 20. An user can interact with the computer or interactive TV by manipulating those graphic images with pointing means 40. The pointing means 40 is held by an user at a distance from the display means 20. The user can point the pointing means 40 at the display means 20, and the position on the display means 20 pointed by the user is the position of the cursor 10. With the cursor 10 on display means 20 directly controlled by the user, the user can easily interact with the computer or interactive TV 30 with the press and release of one or a few select buttons 41 fixed on the pointing means 40. The actions of these selection buttons 41 are coded with either infrared or electromagnetic waves, and is transmitted wirelessly into the computer or interactive TV 30. There is a transmitter 45 on the pointing means 40 to transmit the coded signal, and a receiver 46 on the computer or interactive TV 30 to receive the coded signals for the actions of selection buttons 41. The actions of these selection buttons 41 can also be input directly into the computer or interactive TV through a cable.

The fundamental part of the invention is the idea of using the position pointed by pointing means 40 at a distance as the position of the cursor 10 on the display means 20, as described in the above. The technical part of the invention is (1) the methods of how to construct the pointing means 40 and (2) the methods of how to determine the position on the display means 20 pointed by the pointing means 40 and input that position into the computer 30 as the position of the cursor 10. These methods are described in the following. Eight selected embodiments and one general embodiment are described in the original patent application Ser. No. 08/315,703.

This Continue-In-Parts application discloses some improved embodiments. The construction of the interactive monitor for remote pointers are also described. Additional applications, such as, using a remote control to replace a mouse, using a remote pointer for a remote touch screen and using a remote pointer to construct a game gun, are also described in this CPI application.

SELECTED EMBODIMENTS

Eight selected embodiments and one general embodiment are described.

Figure 2:
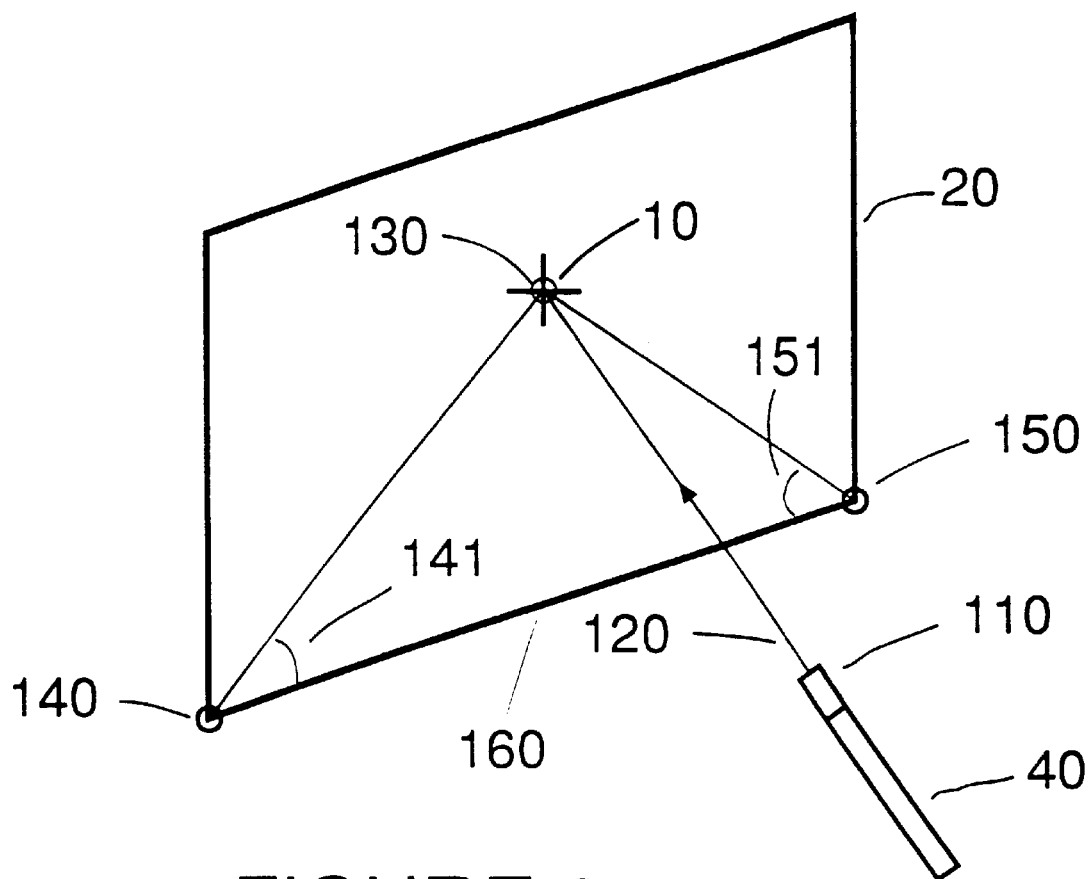
FIG. 2 shows that the light spot, on display means created by a light beam from pointing means, is measured with two angle detectors.

FIG. 2 shows the schematic of the first embodiment. In this first embodiment, there is a light source 110 fixed on the pointing means 40. The light source 110 generates a light beam 120 in the direction pointed by the pointing means 40. The light beam 120 is scattered at a light spot 130 on the display means 20. There are two angle detectors 140 and 150 which are fixed relative to the display means 20. The base line 160 between the two angle detectors 140 and 150 are predetermined. The angle detectors 140 and 150 can the type of devices described in U.S. Pat. No. 4,688,933 to Lapeyre (1987) or the priori arts cited therein.

Angle detector 140 measures the angle 141 between the base line 160 and the line connecting the angle detector 140 and the light spot 130. Angle detector 150 measures the angle 151 between the base line 160 and the line connecting the angle detector 150 and the light spot 130. The measured angles 141 and 151, along with the distance between angle detectors 140 and 150, are input into the computer or into a dedicated Digital Signal Processor (DSP) to calculate the coordinate of the light spot 130. The calculated coordinated is taken as the position of the cursor 10; the calculation is done in real time.

Figure 3A:
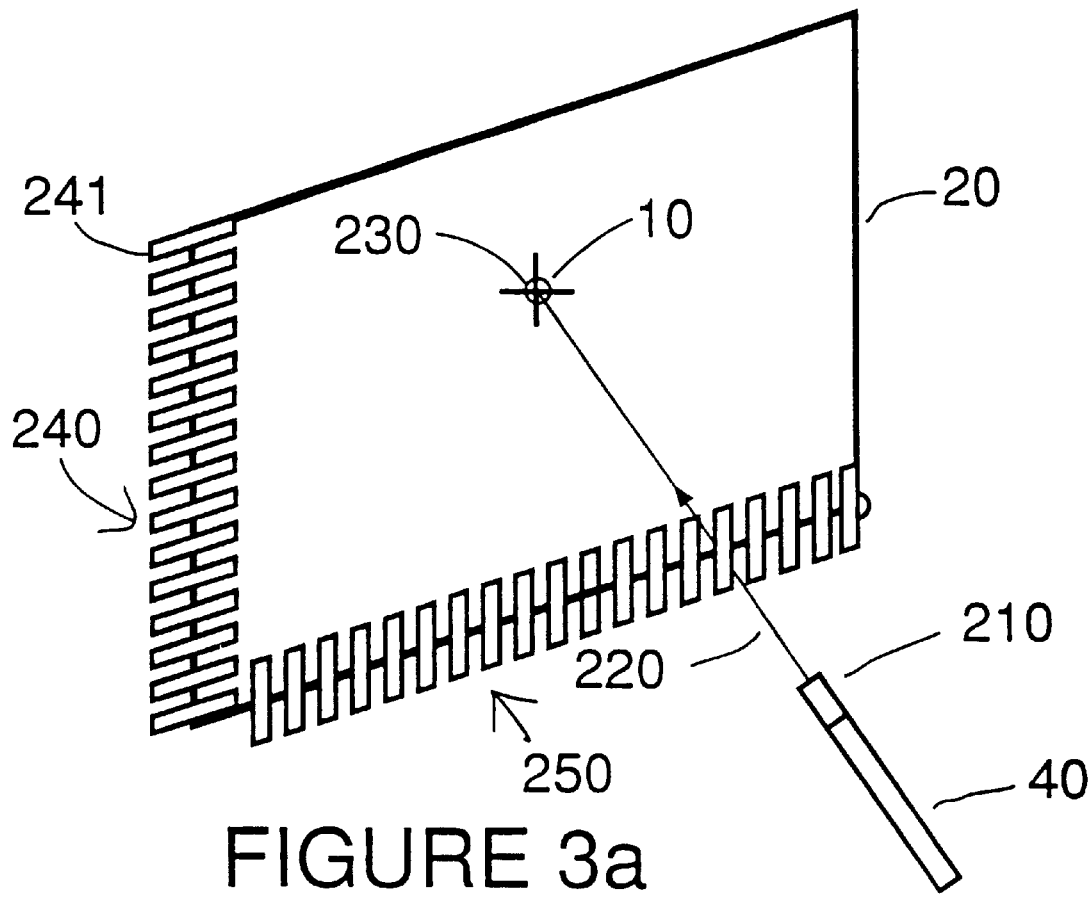
FIG. 3a shows that the light spot, on display means created by a light beam from pointing means, is measured with two arrays of photo detectors.

FIG. 3a shows the schematic of the second embodiment. In this second embodiment, there is a light source 210 fixed on the pointing means 40. The light source 210 generates a light beam 220 in the direction pointed by the pointing means 40. The light beam 220 is scattered at a light spot 230 on the display means 20. There are two arrays of photo detectors 240 and 250 to measure the position of light spot 230.

Figure 3B:
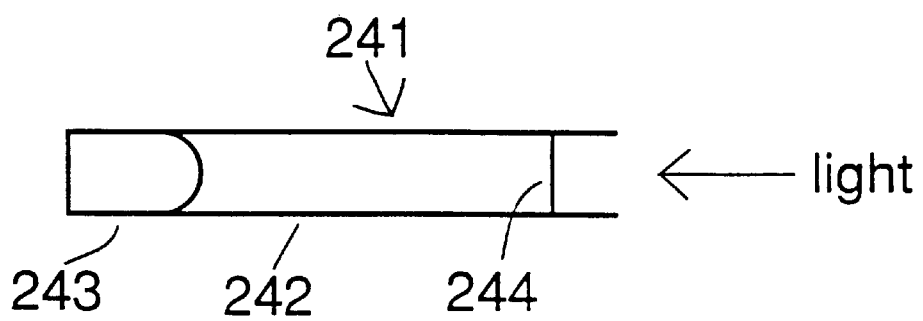
FIG. 3b shows a photo detector with a light guide, a light filter and photo detect means.

As a representative, one photo detector 241 in the photo detector array 240 is shown in FIG. 3a. The structure of the representative photo detector 241 is shown in FIG. 3b. The photo detector 241 consists of a light guide 242 and photo detecting means 243. The light guide 242 provides a narrow field of view and the photo detecting means 243 detect the incoming photo. It is also preferred to install in the light guide 242 a light filter 244 that only allows the light at the wavelength of the light beam to enter the photo detecting means 243.

If the two arrays of photo detectors 240 and 250 are installed orthogonal to each other as illustrated in FIG. 3a, one array of photo detector 240 provides the y coordinate of the light spot 230 and one array of photo detector 250 provides the x coordinate of the light spot 230. Because of the narrow field of view provided by the light guides on each of photo detectors, the light from the light spot 230 can only enter a few of photo detectors in each array of photo detectors, therefore, the signal strength distributions in two arrays of photo detectors provide a good measurement of the coordinate of the light spot 230. The coordinate of the light spot 230 is inputted into the computer as the position of the cursor 10.

Figure 4:
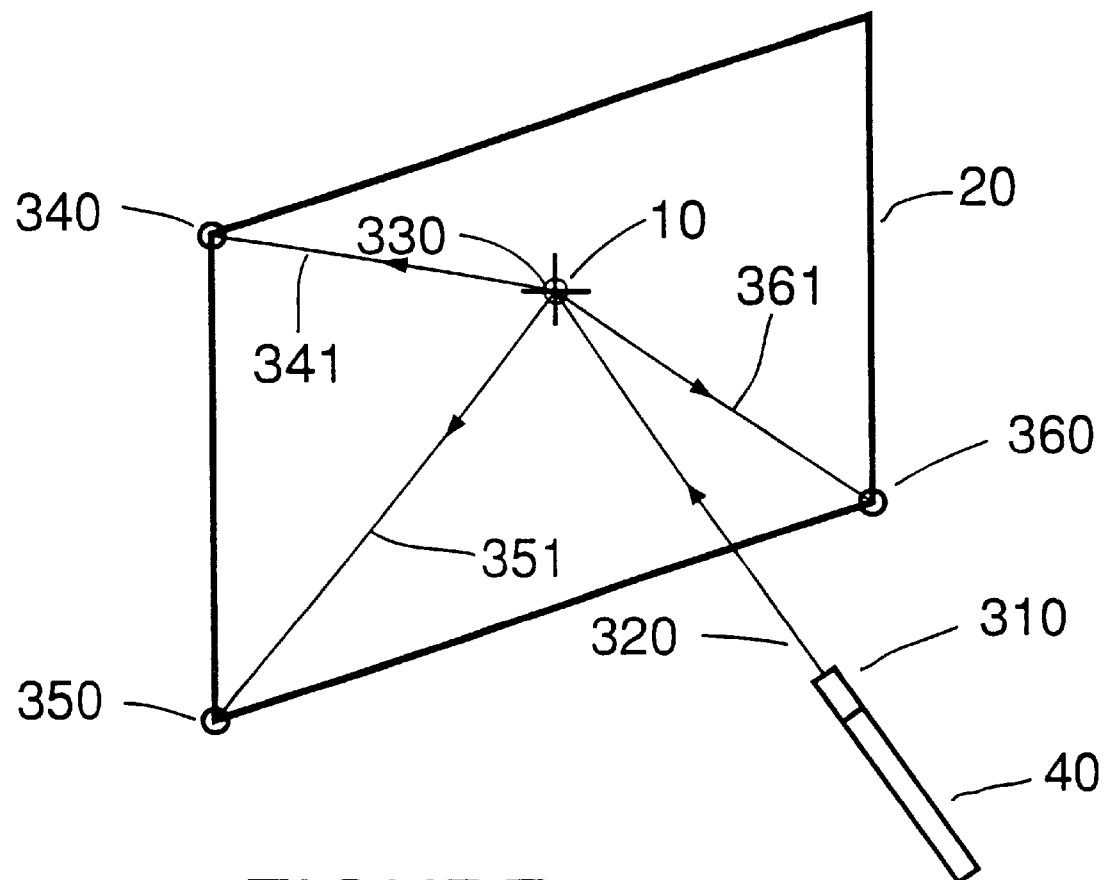
FIG. 4 shows that the spot, on display means at which sonic wave from pointing means is scattered, is measured by three sonic receivers fixed on display means.

FIG. 4 shows the schematic of the third embodiment. In this third embodiment, there is an ultrasonic generator 310 fixed on the pointing means 40. The ultrasonic generator 310 generates a beam of ultrasonic wave 320 in the direction pointed by the pointing means 40. The ultrasonic beam 320 is beamed at the display means 20, and scattered at a spot 330. The position of the spot 330 is measured by three ultrasonic detectors 340, 350 and 360 which are fixed relative to the display means 20.

Suppose that the instant at which the scattered ultrasonic beam arrives detector 340 is $T_4$, the instant at which the scattered ultrasonic beam arrives detector 350 is $T_5$, and the instant at which the scattered ultrasonic beam arrives detector 360 is $T_6$, then the distance 341 from the spot 330 to the detector 340 is $(T_4-T_0)V_S$, the distance 351 from the spot 330 to the detector 350 is $(T_5-T_0)V_S$, and the distance 361 from the spot 330 to the detector 360 is $(T_6-T_0)V_S$, where $T_0$ is the instant at which the sonic beam is scattered and $V_S$ is the velocity of the sound. Even though $T_0$ is not measured, but the time difference $T_4-T_5$ can be measured, therefore, the difference between the two distances 341 and 351 can be measured; similarly, by measuring the time difference $T_6-T_5$, the difference between the two distances 361 and 351 can also be measured. The difference between the two distances 341 and 351 is $(T_4-T_5)V_S$ and the difference between the two distances 361 and 351 is $(T_6-T_5)V_S$. Based on these two parameters $(T_4-T_5)V_S$ and $(T_6-T_5)V_S$, the coordinate of the spot 330 can be calculated. The coordinate of the spot 330 is inputted into the computer as the position of the 10. The calculation is done in real time either with the computer or a dedicated Digital Signal Processor (DSP).

Figure 5:
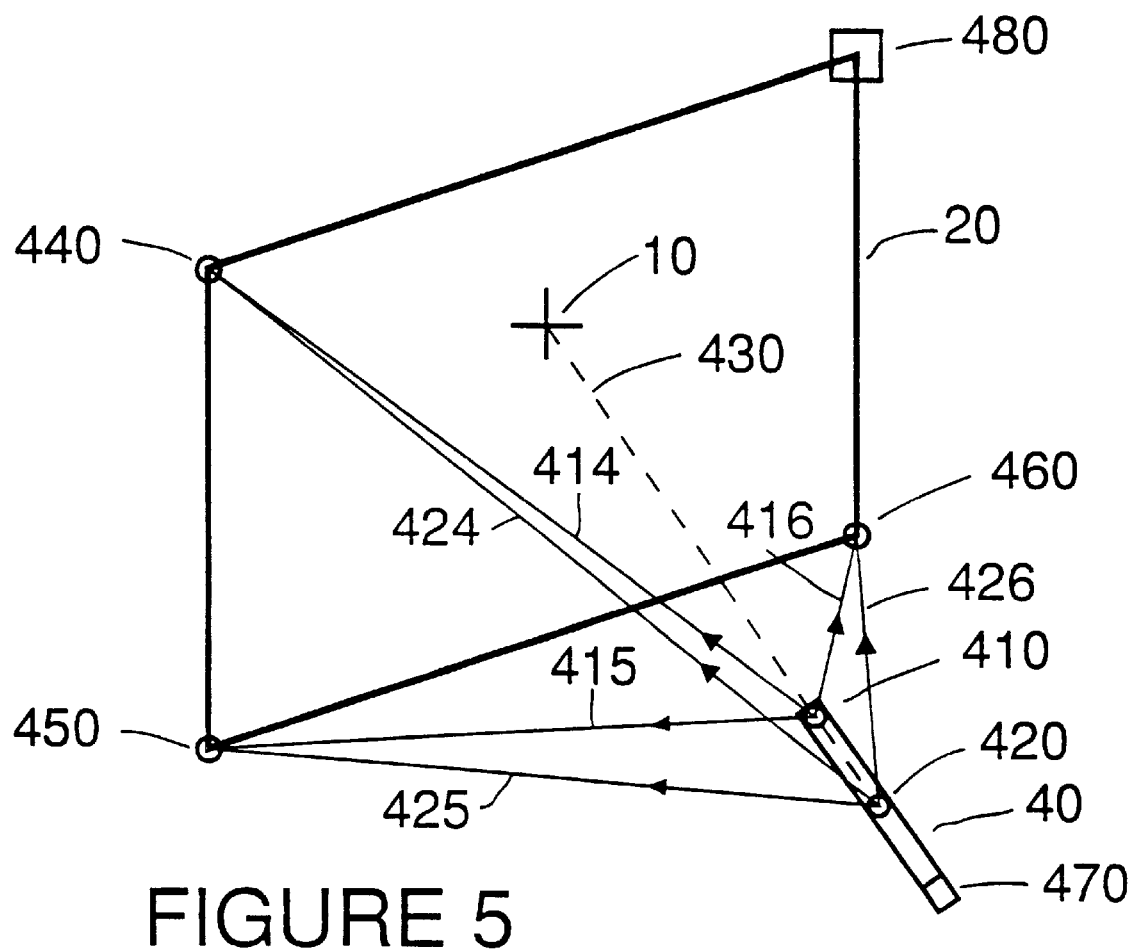
FIG. 5 shows that the positions of two sonic transmitters fixed on pointing means are measured by three sonic receivers fixed on display means.

FIG. 5 shows the schematic of the forth embodiment. In this forth embodiment, there are two sonic transmitters 410 and 420 fixed on the pointing means 40. The reference line 430 connecting the two transmitters 410 and 420 is in the direction pointed by the pointing means 40. There are three sonic receivers 440, 450 and 460. These three sonic receivers are fixed relative to the display means 20. The purpose of this arrangement is to measure six distances: 1) the distance 414 from the transmitter 410 to the receiver 440, 2) the distance 415 from the transmitter 410 to the receiver 450, 3) the distance 416 from the transmitter 410 to the receiver 460, 4) the distance 424 from the transmitter 420 to the receiver 440, 5) the distance 425 from the transmitter 420 to the receiver 450, and 6) the distance 426 from the transmitter 420 to the receiver 460. The measurement of the first three distances determines the position of the transmitter 410, and the measurement of the other three distances determines the position of the transmitter 420. Based on the determined positions of these two transmitters, the position and orientation of the pointing means 40 relative to the display means 20 can be calculated. And based on the position and the orientation of the pointing means 40 relative to the display means 20, the position on the display means 20 pointed by the pointing means can then be calculated and is inputted into the computer as the position of the 10. The calculation is done in real time either with the computer or a dedicated Digital Signal Processor (DSP). In the above calculation, reference line 430 is calculated first based on the coordinates of the transmitters 410 and 420, and then the intersect point between the reference line 430 and the display means 20 is calculated, and the intersect point is just the position on the display means 20 pointed by the pointing means 40.

The above mentioned six distances are measured by measuring the time it takes for the sonic waves to travel from transmitters to receivers. The instant at which the sonic waves is generated is measured by one electromagnetic or infrared transmitter 470 on the pointing means 40 and one electromagnetic or infrared receiver 480 on the display means 20. When the sonic wave is generated by sonic transmitter 410, the transmitter 470 generates an electromagnetic or infrared signal and is detected by the receiver 480; the electromagnetic or infrared signal is also coded to enable the receiver 480 to distinguish between two instant: instant $T_{01}$ at which the sonic wave is generated by the sonic transmitter 410 and instant $T_{02}$ at which the sonic wave is generated by the sonic transmitter 420. To measure the three distances from transmitter 410 to receivers 440, 450 and 460, one needs to measure three instant after the sonic wave is generated by the transmitter 410 at instant $T_{01}$: 1) the instance $T_{41}$ at which the sonic wave arrives 440, 2) the instant $T_{51}$ at which the sonic wave arrives 450, and 3) the instant $T_{62}$ at which the sonic wave arrives 460. The distance 414 from the transmitter 410 to the receiver 440 is $(T_{41}-T_{01})V_S$, the distance 415 from the transmitter 410 to the receiver 450 is $(T_{51}-T_{01})V_S$, and the distance 416 from the transmitter 410 to the receiver 460 is $(T_{61}-T_{01})V_S$, where $V_S$ is the velocity of the sound. Similarly, to measure the three distances from the transmitter 420 to the receivers 440, 450 and 460, one also needs to measure three instant after the sonic wave is generated by the transmitter 420 at instant $T_{02}$: 1) the instant $T_{42}$ at which the sonic wave arrives 440, 2) the instant $T_{52}$ at which the sonic wave arrives 450, and 3) the instant $T_{62}$ at which the sonic wave arrives 460. The distance 424 from the transmitter 420 to the receiver 440 is $(T_{42}-T_{02})V_S$, the distance 425 from the transmitter 420 to the receiver 450 is $(T_{52}-T_{02})V_S$, and the distance 426 from the transmitter 420 to the receiver 460 is $(T_{62}-T_{02})V_S$, where $V_S$ is the velocity of the sound.

Figure 6A:
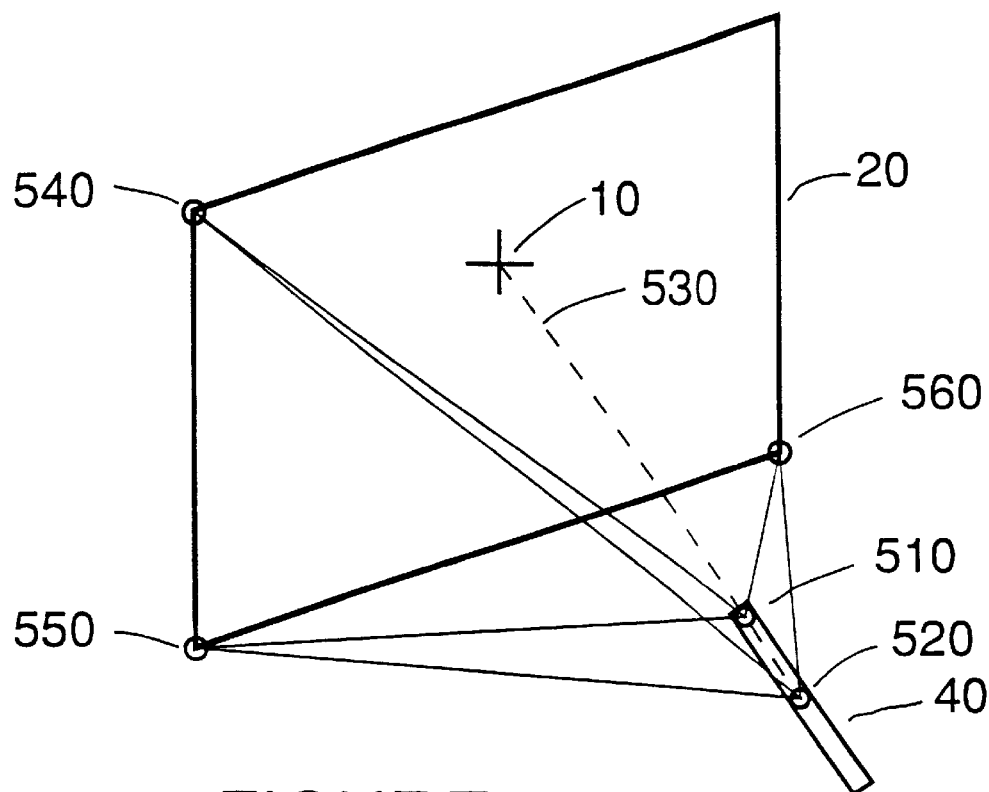
FIG. 6a shows that the positions of two sets of electromagnetic transmitter coils fixed on pointing means are measured by three sets of electromagnetic receiving coils fixed on display means.
Figure 6B:
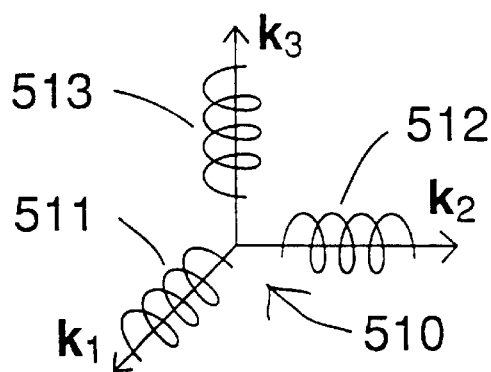
FIG. 6b shows three orthogonal coils forming a set of transmitter coils.
Figure 6C:
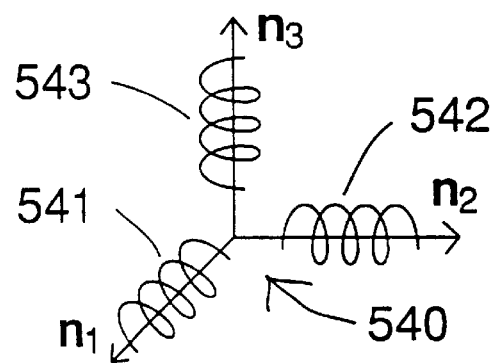
FIG. 6c shows three orthogonal coils forming a set of receiver coils.

FIG. 6a shows the schematic of the fifth embodiment. In this fifth embodiment, there are two sets of electromagnetic transmitter coils 510 and 520, and the reference line 530 connecting the two sets of transmitter coils is in the direction pointed by the pointing means 40; there are also three sets of electromagnetic receiver coils 540, 550 and 560. As shown in FIG. 6b, each set of transmitter coils consists of three coils, and the three coils located at the same position are orthogonal to each other. For example, the transmitter set 510 consists of coils 511, 512 and 513, as shown in FIG. 6b. Each set of receiver coils also consists of three coils, and the three coils located at the same position are orthogonal to each other. For example, the receiver set 540 consists of coils 541, 542 and 543, as shown in FIG. 6c. Similar to the fourth embodiment described above, the purpose of having two sets of transmitter coils on the pointing means 40 and three sets of receiver coils on the display means 20 is to measure six distances: 1) the distance from the transmitter set 510 to the receiver set 540, 2) the distance from the transmitter set 510 to the receiver set 550, 3) the distance from the transmitter set 510 to the receiver 560, 4) the distance from the transmitter set 520 to the receiver set 540, 5) the distance from the transmitter set 520 to the receiver set 550, and 6) the distance from the transmitter set 520 to the receiver set 560. The measurement of the first three distances determines the position of the transmitter set 510, and the measurement of the other three distances determines the position of the transmitter set 520. Based on the positions of these two transmitter sets, the position and orientation of the pointing means 40 relative to the display means 20 can be determined. And based on the position and the orientation of the pointing means 40 relative to the display means 20, the position on the display means 20 pointed by the pointing means can be calculated and is inputted into the computer as the position of the cursor 10. The calculation is done in real time either with the computer or a dedicated Digital Signal Processor (DSP). In the above calculation, reference line 530 is calculated first based on the coordinates of the transmitter sets 510 and 520, and then the intersect point between the reference line 530 and the display means 20 is calculated, where the intersect point is just the position on the display means 20 pointed by the pointing means 40.

The above mentioned six distances are measured by measuring the electromagnetic couplings between each coils in each transmitting set 510 or 520 with each coils in each coils in each receiver set 540, 550, or 560. In the following, the measurement of the distance R from transmitting set 510 to receiving set 540 is described, and the measurement of the other five distances follows the same principle.

Suppose that the three coils 511, 512 and 513 in the transmitter set 510 are identical. Each of the coils has an area $S_t$ and is made from $N_t$ turns of conducting wires. If each of the coils carries a current $I_t$, then, each of the coils has a magnetic dipole moment $m_t = N_t S_t I_t$. Suppose that the magnetic dipole orientation of coil 511 is unit vector $k_1$, the magnetic dipole orientation of coil 512 is unit vector $k_2$, and the magnetic dipole orientation of coil 513 is unit vector $k_3$, then the magnetic field vector at location R generated by coil 511, 512 and 513 are respectively, $$B_1 = \frac{\mu_0}{4\pi} \frac{3(k_1 \cdot R)R - |R|^2 k_1}{|R|^5} m_t, \quad (1)$$

$$B_2 = \frac{\mu_0}{4\pi} \frac{3(k_2 \cdot R)R - |R|^2 k_2}{|R|^5} m_t,$$

$$B_3 = \frac{\mu_0}{4\pi} \frac{3(k_3 \cdot R)R - |R|^2 k_3}{|R|^5} m_t,$$

where R is the vector pointing from the transmitter set 510 to the receiver set 540.

Each of these magnetic field vector is measured with three receiver coils in the receiver set 540. Suppose that the three receiver coils are identical, and each of the coils has an area $S_r$ and $N_r$ turns. The orientation of the receiver coil 541 is unit vector $n_1$, the orientation of the receiver coil 542 is unit vector $n_2$, and the orientation of the receiver coil 543 is unit vector $n_3$. If the current in the transmitter coil 511 is a single frequency ac current at angular frequency $\omega_1$, it will induce ac voltages in the receiver coils 541, 542 and 543, with the same angular frequency $\omega_1$; the voltage across coil 541, 542 and 543 is respectively given by, $$V_{11} = \omega_1 (n_1 \cdot B_1) S_r N_r,$$

$$V_{12} = \omega_1 (n_2 \cdot B_1) S_r N_r, \quad (2)$$

$$V_{13} = \omega_1 (n_3 \cdot B_1) S_r N_r.$$

Similarly, if the current in the transmitter coil 512 is a single frequency ac current at angular frequency $\omega_2$, the induced voltage across coil 541, 542 and 543 at angular frequency $\omega_2$ is respectively given by, $$V_{21} = \omega_2 (n_1 \cdot B_2) S_r N_r,$$

$$V_{22} = \omega_2 (n_2 \cdot B_2) S_r N_r, \quad (3)$$

$$V_{23} = \omega_2 (n_3 \cdot B_2) S_r N_r.$$

And, if the current in the transmitter coil 513 is a single frequency ac current at angular frequency $\omega_3$, the induced voltage across coil 541, 542 and 543 at angular frequency $\omega_3$ is respectively given by, $$V_{31} = \omega_3 (n_1 \cdot B_3) S_r N_r,$$

$$V_{32} = \omega_3 (n_2 \cdot B_3) S_r N_r, \quad (4)$$

$$V_{33} = \omega_3 (n_3 \cdot B_3) S_r N_r.$$

The above nine voltages $V_{11}$, $V_{12}$, $V_{13}$, $V_{21}$, $V_{22}$, $V_{23}$, $V_{31}$, $V_{32}$ and $V_{33}$ measure the magnetic coupling coefficients between the three transmitter coils with the three receiver coils. If these voltages are measured independently, then, using Eq. (1), (2), (3) and (4), the distance R from the transmitter set 510 to the receiver set 530 can be calculated:

$$R = \left[ \frac{(V_{11}^2 + V_{12}^2 + V_{13}^2)/\omega_1^2 + (V_{21}^2 + V_{22}^2 + V_{23}^2)/\omega_2^2 + (V_{31}^2 + V_{32}^2 + V_{33}^2)/\omega_3^2}{(\mu_0/2\pi)^2 m_t^2 N_r^2 S_r^2} \right]^{-1/6} \quad (5)$$

Thus, The distance R from the transmitter set 510 to the receiver set 540 is determined. It is straight forward to extend above equations to the case that the three coils in the transmitter sets are not identical and/or the three coils in the receiver sets are not identical. And this is actually the case that is implemented in the real design of this invention. Since the extension to the real case is straight forward and can be easily performed by the people skilled in the art, the extension is not described here in detail.

In the above paragraphs, the method to calculate the distance from a transmitter set to a receiver set based on the nine voltages is described, and in the following the method to measure independently the nine voltages is described.

Figure 6D:
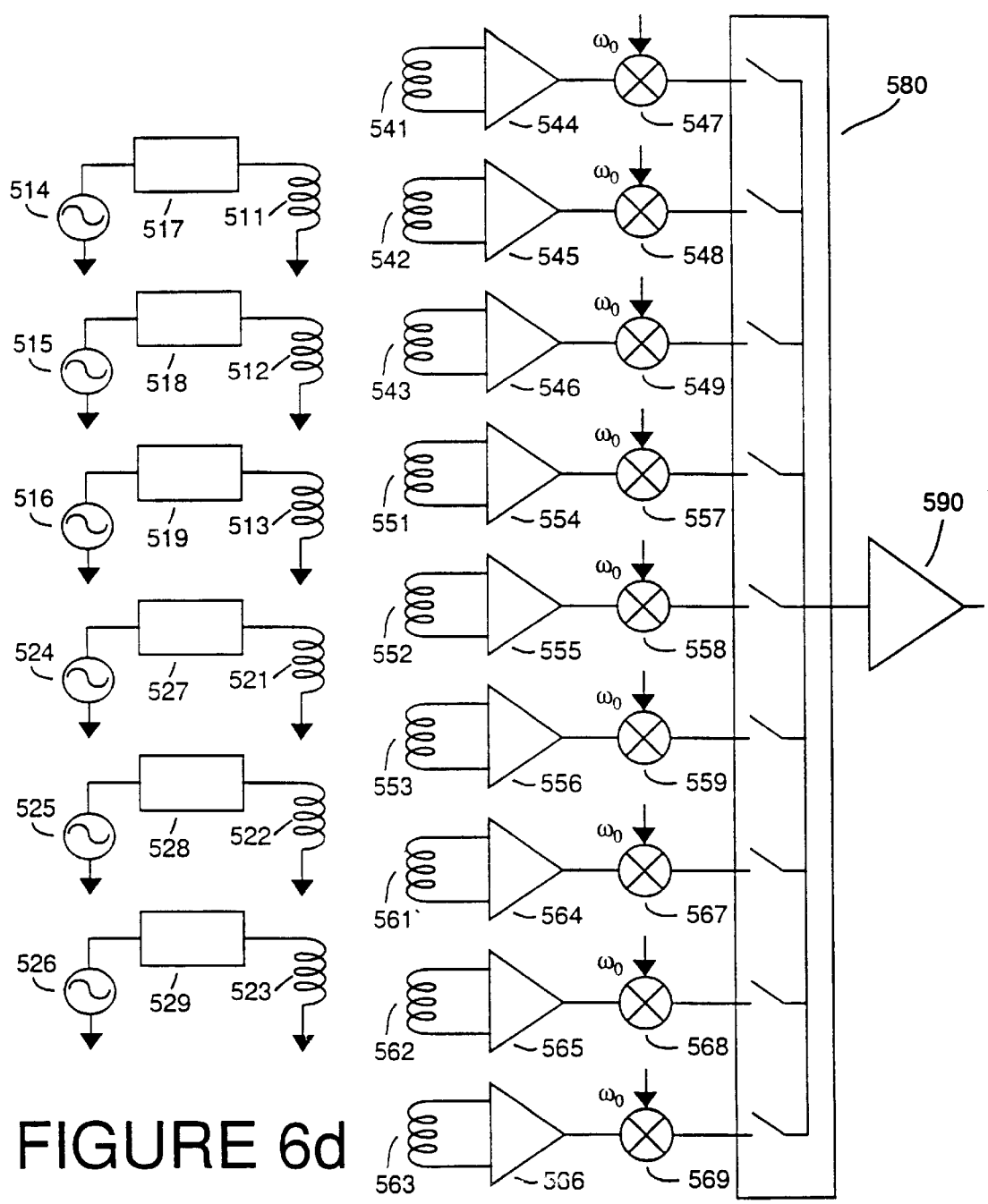
FIG. 6d shows the circuit to measure the magnetic coupling coefficients between the transmitter coils and receiver coils.

The nine voltages can be measured with the electronics shown in FIG. 6d. The ac current in the transmitter coil 511 is generated by a current driver 517 driven by a oscillator 514 with angular frequency $\omega_1$, the ac current in the transmitter coil 512 is generated by a current driver 518 driven by a oscillator 515 with angular frequency $\omega_2$, and the ac current in the transmitter coil 513 is generated by a current driver 519 driven by a oscillator 516 with angular frequency $\omega_3$. The voltage across the receiver coil 541 is amplified by a low noise amplifier 544, and demodulated with angular frequency $\omega_0$ by a demodulator 547. The output wave form from the demodulator 547 is coupled to an Analog to Digital Converter (ADC) 590 via a multiplexer 580. Then, the digitized wave form from the demodulator 547 is Fourier transformed. The frequency component of $|\omega_1-\omega_0|$ gives the measurement of $V_{11}$, the frequency component of $|\omega_2-\omega_0|$ gives the measurement of $V_{12}$, and the frequency component of $|\omega_3-\omega_0|$ gives the measurement of $V_{13}$. Similarly, following the same principle, the measurement of $V_{21}$, $V_{22}$ and $V_{23}$ can be achieved by measuring frequency components $|\omega_1-\omega_0|$, $|\omega_2-\omega_0|$ and $|\omega_3-\omega_0|$ in the Fourier transform of the digitized wave form from the demodulator 548. And the measurement of $V_{31}$, $V_{32}$ and $V_{33}$ can be achieved by measuring frequency components $|\omega_1-\omega_0|$, $|\omega_2-\omega_0|$ and $|\omega_3-\omega_0|$ in the Fourier transform of the digitized wave form from the demodulator 549. Thus, the nine voltages induced in the three receiver coils (541, 542, and 543) by the three transmitter coils (511, 512, and 513) are measured independently with three transmitter channels (involving 511, 512, and 513) and three receiver channels (involving 541, 542, and 543). These three transmitter channels and three receiver channels are used to determine the distance from the transmitter set 510 to the receiver set 540.

In a similar manna, the distance from the transmitter set 520 to the receiver set 540 is determined by using three transmitter channels (involving 521, 522, and 523) and three receiver channels (involving 541, 542, and 543). The coil 521 is excited with angular frequency $\omega_4$, the coil 522 is excited with angular frequency $\omega_5$ and the coil 523 is excited with angular frequency $\omega_6$. Because different frequency components are distinguishable in a receiver channel, the induced voltage in a receiver coil by the magnetic field from different transmitter coils is thus distinguishable. By measuring the three frequency components ($\omega_4$, $\omega_5$ and $\omega_6$) in the three receiver channels (involving 541, 542 and 543), the nine voltages induced in the receiver coils 541, 542 and 543 by the transmitter coils 521, 522 and 523 can be independently measured. And using these nine voltages, the distance from the transmitter set 520 to the receiver set 540 is calculated using an equation similar to Eq. (5).

In FIG. 6d, there are six transmitter channels and nine receiver channels. As described in the last two paragraphs, three transmitter channels (involving 511, 512 and 513) and three receiver channels (involving 541, 542 and 543) are used to determine the distance from the transmitter set 510 to the receiver set 540, and three transmitter channels (involving 521, 522 and 523) and three receiver channels (involving 541, 542 and 543) are used to determine the distance from the transmitter set 520 to the receiver set 540. To summarize the functions of remaining channels, three transmitter channels (involving 511, 512 and 513) and three receiver channels (involving 551, 552 and 553) are used to determine the distance from the transmitter set 510 to the receiver set 550, three transmitter channels (involving 521, 522 and 523) and three receiver channels (involving 551, 552 and 553) are used to determine the distance from the transmitter set 520 to the receiver set 550, three transmitter channels (involving 511, 512 and 513) and three receiver channels (involving 561, 562 and 563) are used to determine the distance from the transmitter set 510 to the receiver set 560, and three transmitter channels (involving 521, 522 and 523) and three receiver channels (involving 561, 562 and 563) are used to determine the distance from the transmitter set 520 to the receiver set 560.

Figure 7A:
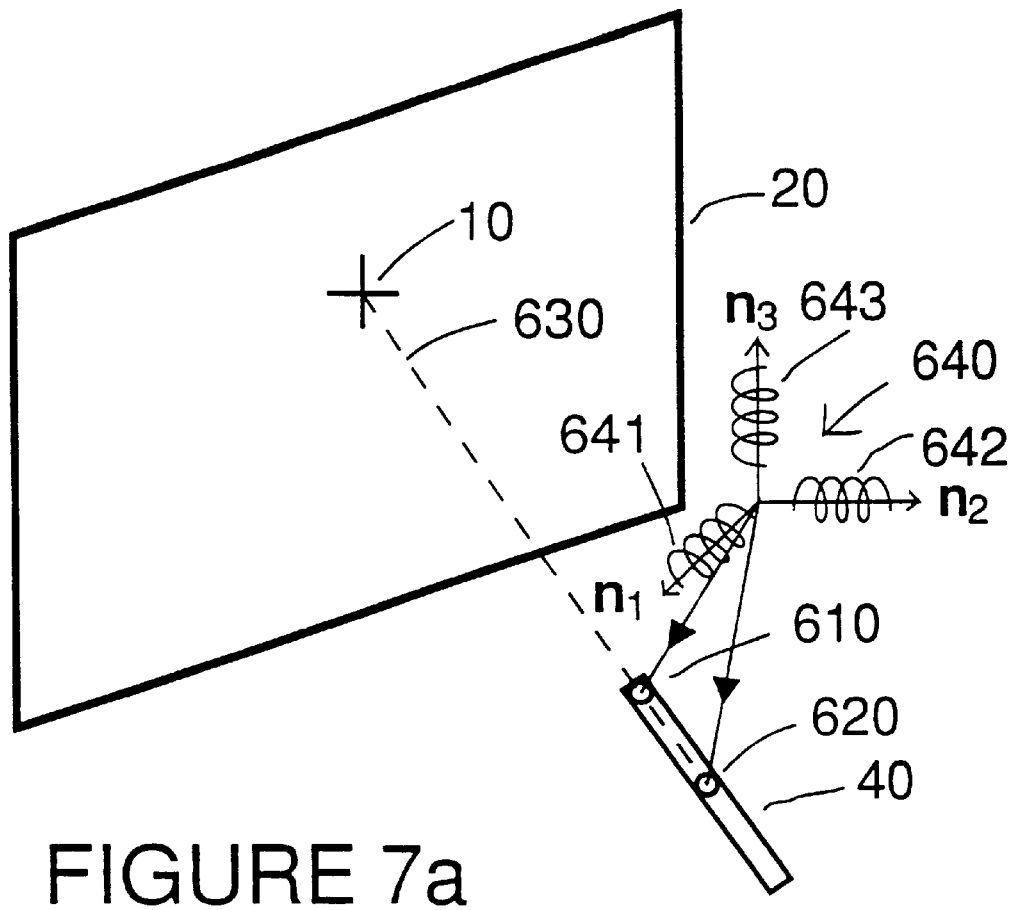
FIG. 7a shows that the positions of two sets of electromagnetic transmitter coils fixed on pointing means are measured by a set of three electromagnetic receiving coils which are orthogonal to each other.
Figure 7B:
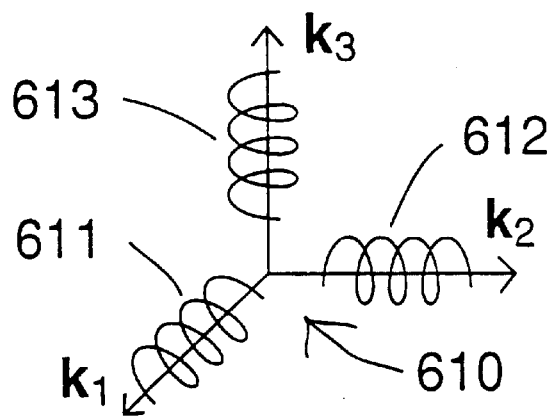
FIG. 7b shows three orthogonal coils forming a set of transmitter coils.

FIG. 7a shows the schematic of the six embodiment This six embodiment is similar to the fifth embodiment described above: there are two sets of electromagnetic transmitter coils 610 and 620, and the reference line 630 connecting the two sets of transmitting coils is in the direction pointed by the pointing means 40. But, unlike the fifth embodiment that uses three electromagnetic receiver sets, the six embodiment uses only one electromagnetic receiver set 640. And the receiver set 640 still consists of three orthogonal coils 641, 642 and 643 located at the same position. Each set of transmitter coils still consists of three orthogonal coils located at the same position. For example, the transmitter set 610 consists of coils 611, 612 and 613, as shown in FIG. 6b. The three receiver coils are fixed relative to the display means 20 both in position and in orientation, and define an receiver reference frame: the origin of the frame is the position of the receiver set 610, the x-axis direction is the orientation $n_1$ of the coil 641, the y-axis direction is the orientation $n_2$ of the coil 642, and the z-axis direction is the orientation $n_3$ of the coil 643, where $n_1$, $n_2$, and $n_3$ are unit vectors.

Compared with the fifth embodiment in which three distances are measured to determine the position of the first transmitter set 610 and three distances are measured to determine the position of the second transmitter set 620, in the six embodiment, three Cartesian coordinates in the receiver reference frame are calculated to determine the position of the first transmitter set 610, and another three Cartesian coordinates in the receiver reference frame are calculated to determine the position of the second transmitter set 620. Based on the positions of these two transmitter sets, the position and orientation of the pointing means 40 relative to the display means 20 can be determined. And based on the position and the orientation of the pointing means 40 relative to the display means 20, the position on the display means 20 pointed by the pointing means 40 can be calculated and is inputted into the computer as the position of the 10. The calculation is done in real time either with the computer or a dedicated Digital Signal Processor (DSP). In the above calculation, reference line 630 is calculated first based on the coordinates of the transmitter sets 610 and 620, and then the intersect point between the reference line 630 and the display means 20 is calculated, and the intersect point is just the position on the display means 20 pointed by the pointing means 40.

The calculation of the Cartesian coordinates of the first transmitter set 610 in the receiver reference frame is similar to the calculation of the Cartesian coordinates of the second transmitter set 620. Only the calculation for transmitter set 610 is described in the following, and the calculation for the transmitter set 620 follows the same principle.

Assume that the three transmitter coils 611, 612 and 613 are excited respectively by a ac current with angular frequency $\omega_1$, $\omega_2$ and $\omega_3$, then, the Cartesian coordinates of the transmitter set 610 can be calculated based nine voltages: $V_{11}$, $V_{12}$, $V_{13}$, $V_{21}$, $V_{22}$, $V_{23}$, $V_{31}$, $V_{31}$ and $V_{33}$. Here, $V_{11}$, $V_{12}$, and $V_{13}$ is respectively the voltage across the receiver coil 641, 642 and 643, induced by the transmitter coil 611 with angular frequency $\omega_1$; $V_{21}$, $V_{22}$, and $V_{23}$ is respectively the voltage across the receiver coil 641, 642 and 643, induced by the transmitter coil 612 with angular frequency $\omega_2$; $V_{31}$, $V_{32}$, and $V_{33}$ is respectively the voltage across the receiver coil 641, 642 and 643, induced by the transmitter coil 613 with angular frequency $\omega_3$. The equations to calculate these nine voltages are the same as previously derived in the description of the fifth embodiment and is not repeated here. And based on these equations, the Cartesian coordinates of the transmitter set 610 in the receiver reference is derived:

$$X = R \cdot n_1 = \frac{R}{\sqrt{3}} \left\{ \frac{R^6[(V_{11}/\omega_1)^2 + (V_{21}/\omega_2)^2 + (V_{31}/\omega_3)^2 +]}{(\mu_0/4\pi)^2 m_t^2 S_r^2 N_r^2} - 1 \right\}^{1/2}, \quad (6)$$

$$Y = R \cdot n_2 = \frac{R}{\sqrt{3}} \left\{ \frac{R^6[(V_{12}/\omega_1)^2 + (V_{22}/\omega_2)^2 + (V_{32}/\omega_3)^2 +]}{(\mu_0/4\pi)^2 m_t^2 S_r^2 N_r^2} - 1 \right\}^{1/2},$$

$$X = R \cdot n_3 = \frac{R}{\sqrt{3}} \left\{ \frac{R^6[(V_{13}/\omega_1)^2 + (V_{23}/\omega_2)^2 + (V_{33}/\omega_3)^2 +]}{(\mu_0/4\pi)^2 m_t^2 S_r^2 N_r^2} - 1 \right\}^{1/2},$$

where R is given by Eq. (5).

Thus, the position of the transmitter set 610 is calculated based on the nine magnetic coupling coefficients between the three coils in the transmitter set 610 and the three coils in the receiver set 640. Similarly, the position of the transmitter set 620 can be calculated based on the nine magnetic coupling coefficient between the three coils in the transmitter set 620 and the three coils in the receiver set 640. The above calculation is also based on the assumption that the three transmitter coils are identical to each other and/or the three receiver coils are identical to each other. In the real embodiment, the three transmitter coils are not necessarily identical to each other, and neither are the three receiver coils. The extension to this real case from the above idealized calculation is straight forward, and can be easily performed by the people skilled in the art, and thus, the extension is not described here in detail. To emphasize again the difference between the fifth and the six embodiment, it is realized that in this six embodiment, one receiver set is sufficient to determine the position and orientation of the pointing means 40, even though three receiver sets are used in embodiment five.

Figure 7D:
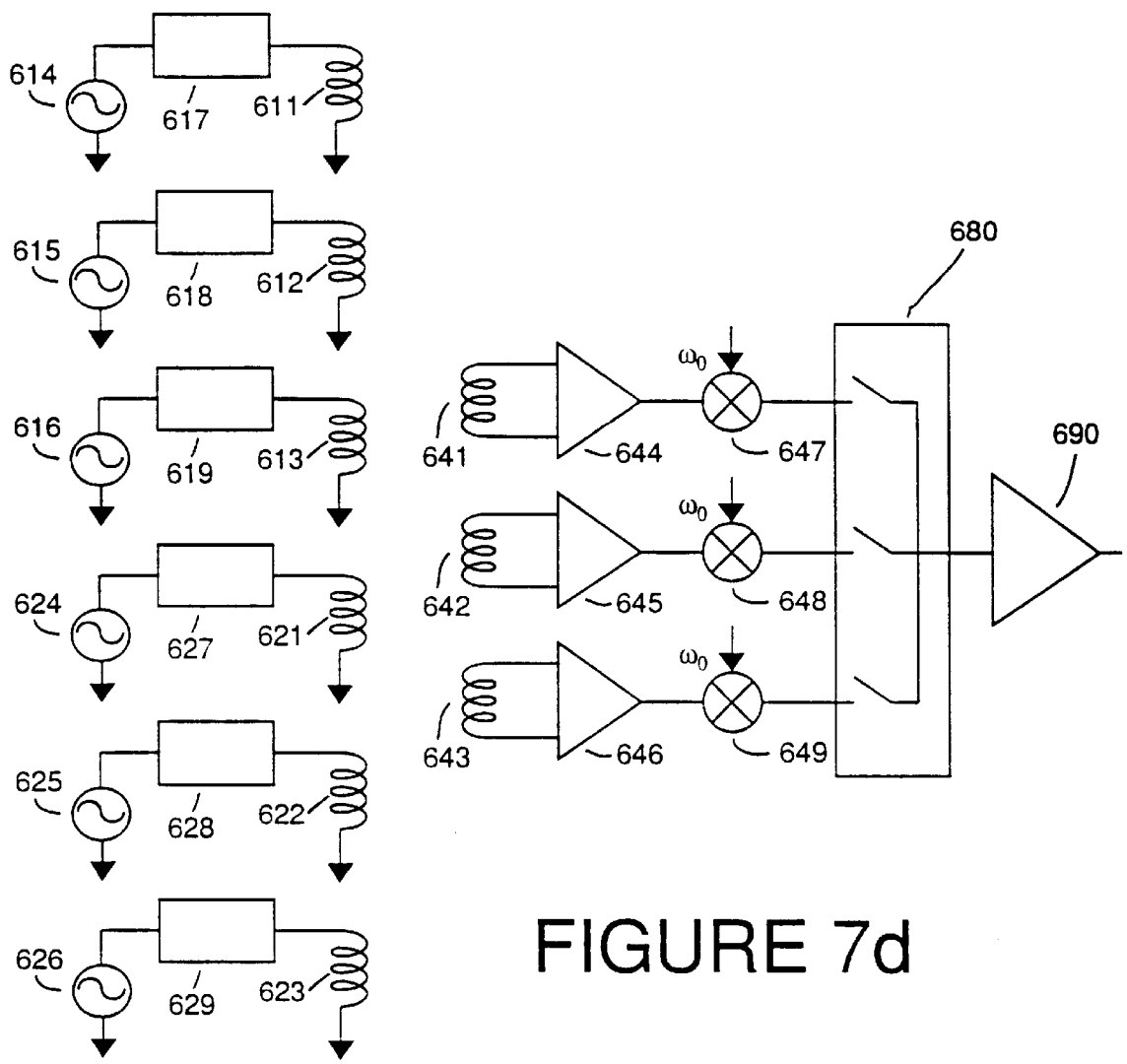
FIG. 7d shows the circuit to measure the magnetic coupling coefficients between the transmitter coils and receiver coils.

The magnetic coupling coefficients are measured by the electronics shown in FIG. 7d. The principle of the circuit is the same as that in the fifth embodiment, and is not repeated here. Three transmitter channels (involving 611, 612 and 613) and three receiver channels (involving 641, 642 and 643) are used to determine the position of the transmitter set 610; three transmitter channels (involving 621, 622 and 623) and three receiver channels (involving 641, 642 and 643) are used to determine the position of the transmitter set 620.

Figure 8A:
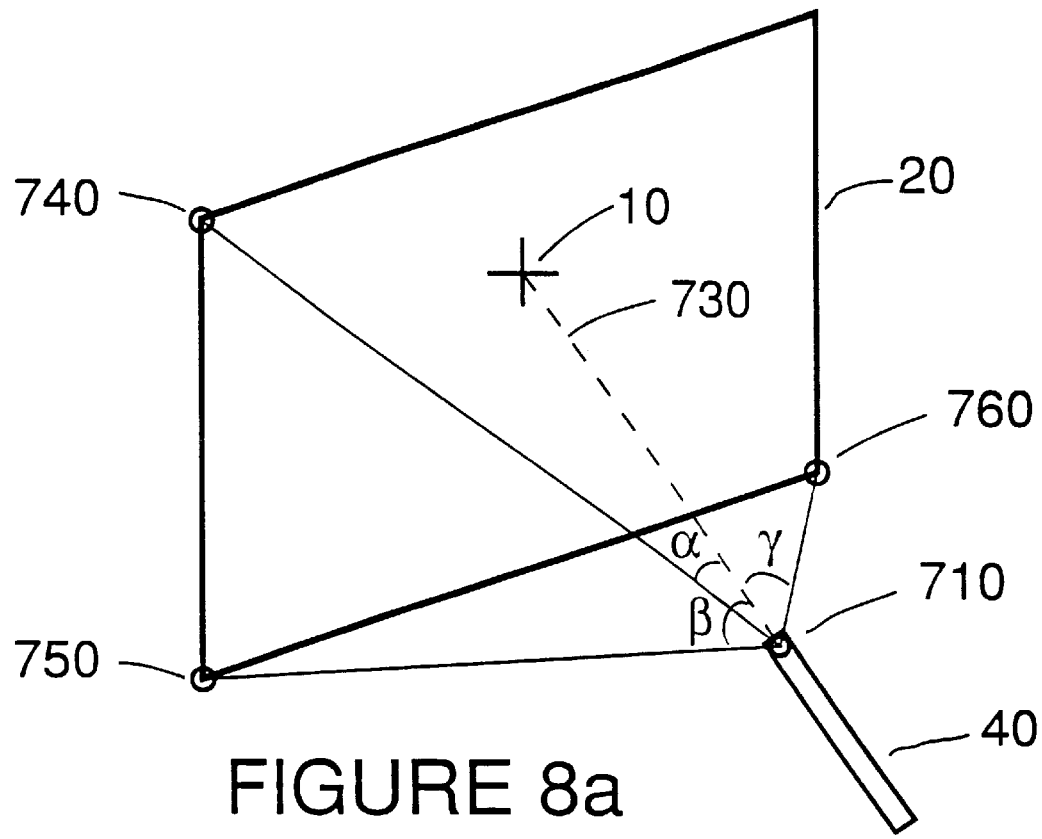
FIG. 8a shows that the position of a set of electromagnetic transmitting coils is measured by three sets of electromagnetic receiving coils, so is measured the angles $\alpha$, $\beta$, and $\gamma$.
Figure 8B:
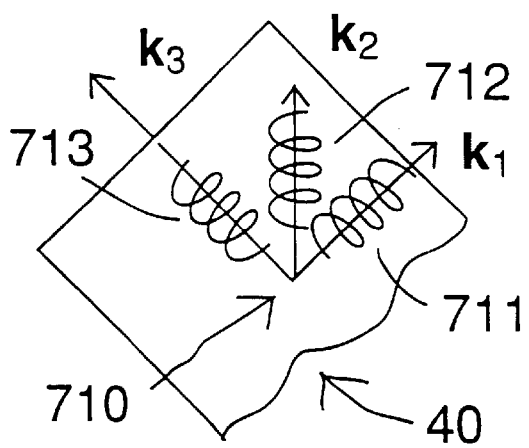
FIG. 8b shows three orthogonal coils forming the set of transmitter coils, with one of the coils in the direction pointed by pointing means.
Figure 8C:
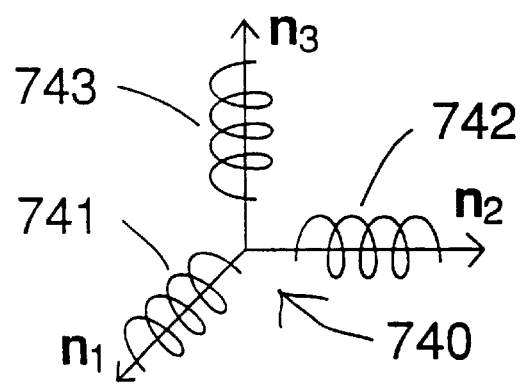
FIG. 8c shows three orthogonal coils forming a set of transmitter coils.

FIG. 8a shows the schematic of the seventh embodiment. In this seventh embodiment, there are one set of transmitter coils 710 and three sets of receiver coils 740, 750 and 760. As shown in FIG. 8b, the transmitter set 710 consists of three orthogonal coils 711, 712 and 713, and the orientation of the transmitter coil 713 is in the direction pointed by the pointing means 40. And as shown in FIG. 8c, each receiver set also consists of three orthogonal receiver coils, and for example, the receiver set 740 consists of three orthogonal receiver coils 741, 742 and 743.

In fifth and sixth embodiment, two transmitter sets are used, and the positions of the two transmitter sets are used to calculated both the position and the orientation of the pointing means 40. In this seventh embodiment, however, only one transmitter set is used, and to determine the position on the display means 20 pointed by the pointing means 40, one still need to know both the position and the orientation of the pointing means 40. And in this embodiment, the position of the pointing means is measured by measuring three distances: the distance from the transmitter set 710 to the receiver set 740, the distance from the transmitter set 710 to the receiver set 750 and the distance from the transmitter set 710 to the receiver set 760. The principle to measure the distance from one transmitter set to one receiver set is described in the description of embodiment five, and is not repeated here in detail. And simply summarize the principle, it involves the measurement of the nine magnetic coupling coefficients between the three coils in the transmitter set with the three coils in the receiver set. And in this embodiment, the orientation of the pointing means 40 is determined by the orientation $k_3$ of the transmitter coil 713. The principle to measure the orientation $k_3$ of the transmitter coil 713 is described in the following.

As shown in FIG. 8a, the orientation of the pointing means 40 (or the orientation of the coil 713) is determined by three angles: 1) the angle α between the orientation of the coil 713 and the reference line connecting transmitter set 710 with receiver set 740, 2) the angle β between the orientation of the coil 713 and the reference line connecting transmitter set 710 with receiver set 750, and 3) the angle γ between the orientation of the coil 713 and the reference line connecting transmitter set 710 with receiver set 760. These three angles are measured in similar manner. Only the measurement of the angle α is described in the following, and the measurement of the other two angles β and γ follows the same principle.

Assume that the three transmitter coils 711, 712 and 713 are excited respectively by a ac current with angular frequency $\omega_1$, $\omega_2$ and $\omega_3$, and like the measurement of the distance from the transmitter set 710 to the receiver set 740, the measurement of the angle α also involves the measurement of nine voltages: $V_{11}$, $V_{12}$, $V_{13}$, $V_{21}$, $V_{22}$, $V_{23}$, $V_{31}$, $V_{32}$ and $V_{33}$. Here, $V_{11}$, $V_{12}$, and $V_{13}$ is respectively the voltage across the receiver coil 741, 742 and 743, induced by the transmitter coil 711 with angular frequency $\omega_1$; $V_{21}$, $V_{22}$, and $V_{23}$ is respectively the voltage across the receiver coil 741, 742 and 743, induced by the transmitter coil 712 with angular frequency $\omega_2$; $V_{31}$, $V_{32}$, and $V_{33}$ is respectively the voltage across the receiver coil 741, 742 and 743, induced by the transmitter coil 713 with angular frequency $\omega_3$. The equations to calculate these nine voltages are the same as previously derived in the description of the fifth embodiment and is not repeated here. And based on these equations, the cosine of the angle α between the orientation $k_3$ of the coil 713 and the vector R is derived:

$$\cos\alpha = R \cdot k_3 / R = \frac{1}{\sqrt{3}} \left\{ \frac{16\pi^2 R^6 (V_{31}^2 + V_{31}^2 + V_{31}^2)}{\mu_0^2 m_t^2 S_r^2 N_r^2 \omega_3^2} - 1 \right\}^{1/2}. \quad (7)$$

where R is given by Eq.(5) and R is the vector pointing from the transmitter set 710 to the receiver set 740.

Thus, the angle α is calculated based on the nine magnetic coupling coefficients between the three coils in the transmitter set 710 with the three coils in the receiver set 740. Similarly, the angle β is calculated based on the nine magnetic coupling coefficients between the three coils in the transmitter set 710 with the three coils in the receiver set 750, and the angle γ is calculated based on the nine magnetic coupling coefficients between the three coils in the transmitter set 710 with the three coils in the receiver set 760. With these three angles, the orientation $k_3$ of the transmitter coil 713 is determined, that is, the orientation of the pointing means 40 is determined. Once the orientation and the position of the pointing means is known, the position on the display means 20 pointed by the opining means 40 can be calculated and inputted into the computer as the position of the cursor 10. The calculation is done in real time with the computer or with a dedicated DSP.

Figure 8D:
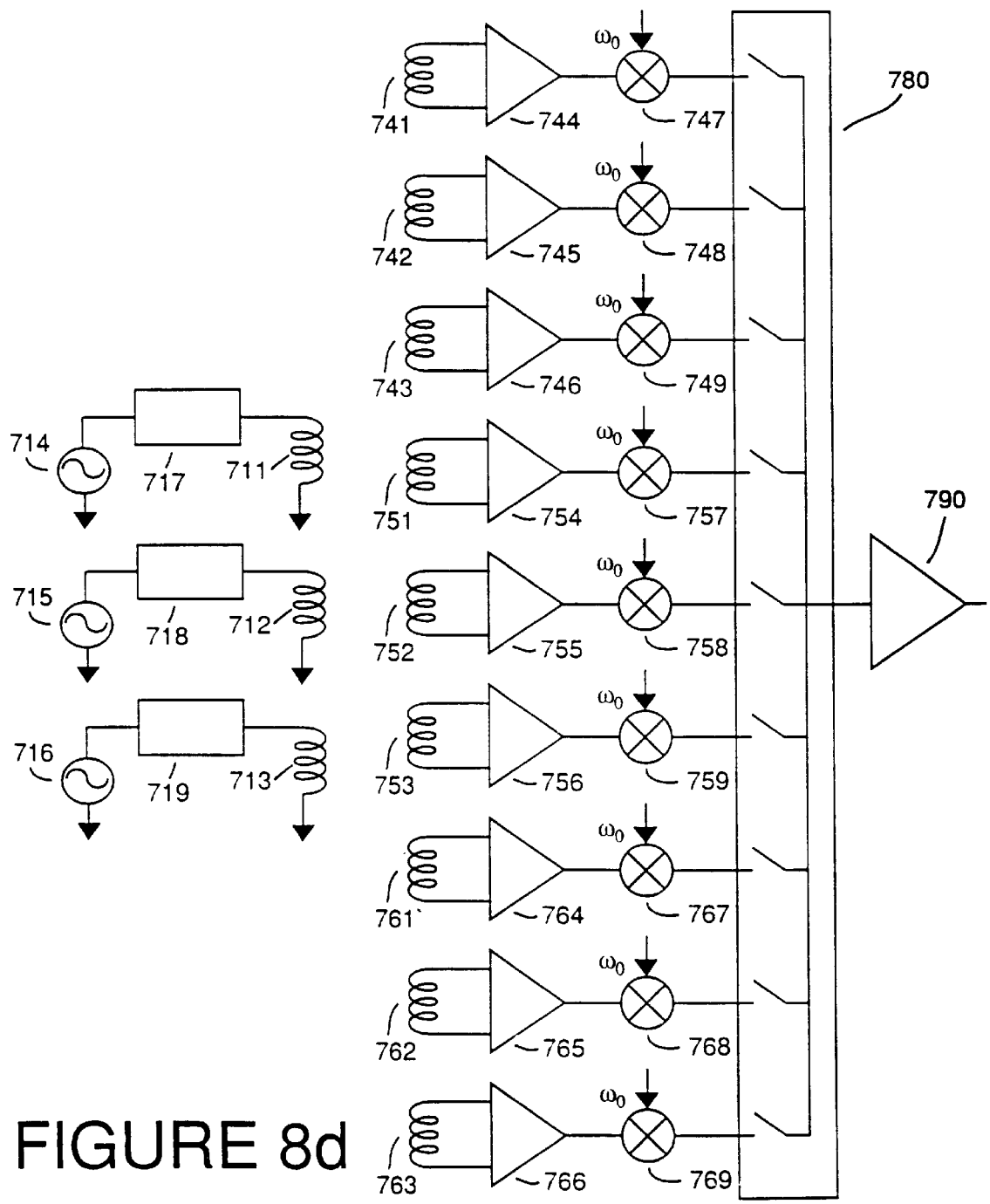
FIG. 8d shows the circuit to measure the magnetic coupling coefficients between the transmitter coils and receiver coils.
Figure 9A:
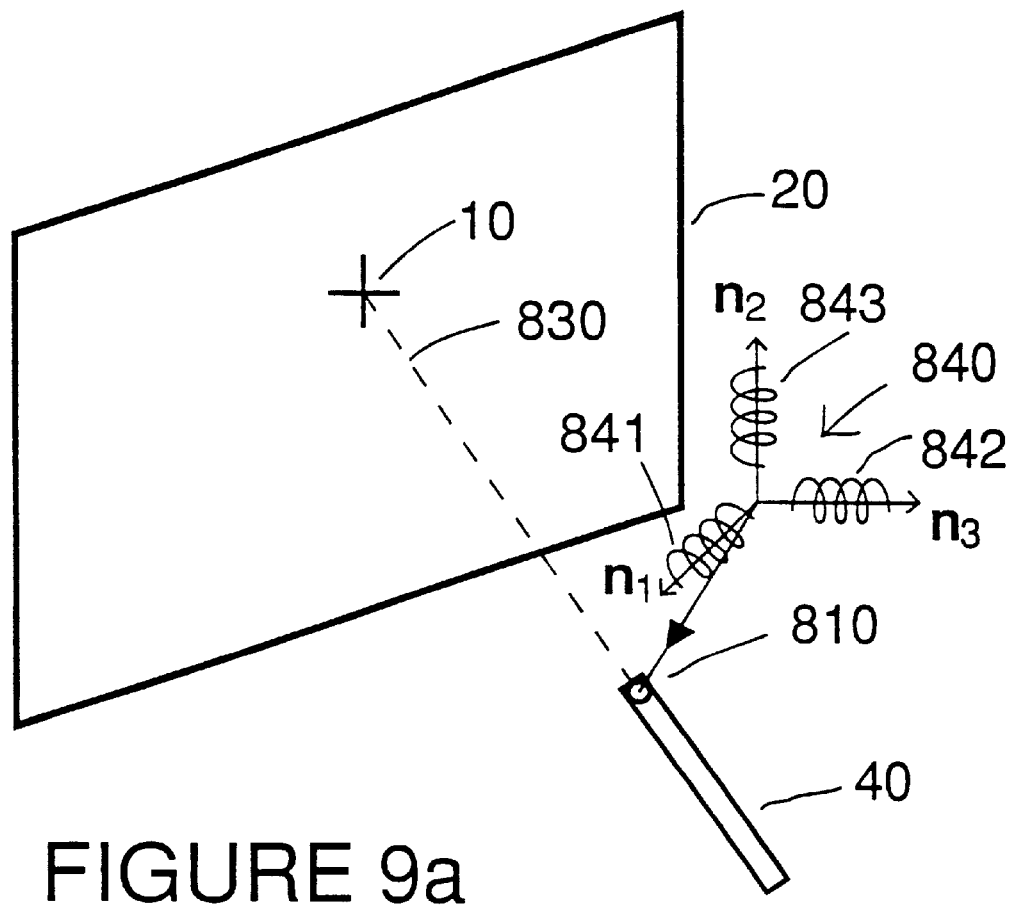
FIG. 9a shows that the position of a set of electromagnetic transmitting coils and the direction pointed by pointing means, are measured by a set of three electromagnetic receiving coils which are orthogonal to each other.
Figure 9B:
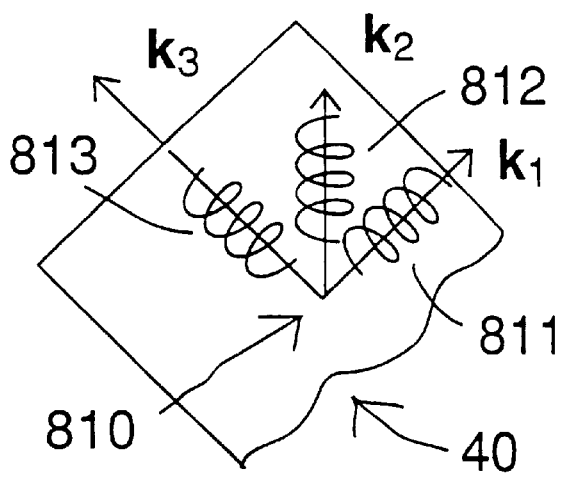
FIG. 9b shows three orthogonal coils forming the set of transmitter coils, with one of the coils in the direction pointed by pointing means.

The magnetic coupling coefficients are measured by the electronics shown in FIG. 8d. The principle of the circuit is the same as that in the fifth embodiment, and is not repeated here. Three transmitter channels (involving 711, 712 and 713 ) and three receiver channels (involving 741, 742 and 743) are used to determine the angle α and the distance from the transmitter set 710 to the receiver set 740; three transmitter channels (involving 711, 712 and 713 ) and three receiver channels (involving 751, 752 and 753) are used to determine the angle β and the distance from the transmitter set 710 to the receiver set 750; three transmitter channels (involving 711, 712 and 713) and three receiver channels (involving 761, 762 and 763) are used to determine the angle γ and the distance from the transmitter set 710 to the receiver set 760;

FIG. 9a shows the schematic of the eighth embodiment. In this eighth embodiment, there are only one set of transmitter coils 810 and one set of receiver coils 840. FIG. 9b shows that the transmitter set consists of three orthogonal transmitter coils 811, 812 and 813, and the orientation $k_3$ of the transmitter coil 813 is in the direction pointed by the pointing means 40. The receiver set 840 also consists of three orthogonal coils 841, 842 and 843. Just like in embodiment six, the three receiver coils are fixed relative to the display means 20 both in position and in orientation, and define an receiver reference frame: the origin of the frame is the position of the receiver set 810, the x-axis direction is the orientation $n_1$ of the coil 841, the y-axis direction is the orientation $n_2$ of the coil 842, and the z-axis direction is the orientation $n_3$ of the coil 843, where $n_1$, $n_2$, and $n_3$ are unit vectors.

Both the position and the orientation of the pointing means 40 are determined from the nine magnetic coupling coefficients between the three coils in transmitter set 810 and the three coils in the receiver set 840. The position of the pointing means 40 is the position of the transmitter set 810, and the orientation of the pointing means 40 is the orientation $k_3$ of the transmitter coil 813. The position of the transmitter set 810 is measured by measuring the three Cartesian coordinates in the receiver reference frame as described in embodiment six, and the principle of the measurement is not repeated here. Only the principle of measuring the orientation $k_3$ of the transmitter coil 813 is described in detail in the following.

The orientation of the transmitter coil 813 is specified by the unit vector $k_3$. The three components of the unit vector $k_3$ along the coordinate direction $n_1$, $n_2$ and $n_3$ can be calculated in terms of nine voltages, $V_{11}$, $V_{12}$, $V_{13}$, $V_{21}$, $V_{22}$, $V_{23}$, $V_{31}$, $V_{32}$ and $V_{33}$, assuming that the three transmitter coils 811, 812 and 813 are excited respectively by a ac current with angular frequency $\omega_1$, $\omega_2$ and $\omega_3$. Here, $V_{11}$, $V_{12}$, and $V_{13}$ is respectively the voltage across the receiver coil 841, 842 and 843, induced by the transmitter coil 811 with angular frequency $\omega_1$; $V_{21}$, $V_{22}$, and $V_{23}$ is respectively the voltage across the receiver coil 841, 842 and 843, induced by the transmitter coil 812 with angular frequency $\omega_2$; $V_{31}$, $V_{32}$, and $V_{33}$ is respectively the voltage across the receiver coil 841, 842 and 843, induced by the transmitter coil 813 with angular frequency $\omega_3$. The equations to calculate these nine voltages are the same as previously derived in the description of the fifth embodiment and is not repeated here. And based on these equations, the components of unit vector $k_3$ along the coordinate directions $n_1$, $n_2$ and $n_3$ are respectively given by $$k_3 \cdot n_1 = \frac{1}{R^2} \left[ 3(R \cdot k_3)(R \cdot n_1) - \frac{4\pi R^5 V_{31}}{\omega_3 S_r N_r} \right], \quad (8)$$

$$k_3 \cdot n_2 = \frac{1}{R^2} \left[ 3(R \cdot k_3)(R \cdot n_2) - \frac{4\pi R^5 V_{32}}{\omega_3 S_r N_r} \right],$$

$$k_3 \cdot n_3 = \frac{1}{R^2} \left[ 3(R \cdot k_3)(R \cdot n_3) - \frac{4\pi R^5 V_{33}}{\omega_3 S_r N_r} \right],$$

where $R \cdot n_1$, $R \cdot n_2$ and $R \cdot n_3$ are given by Eq.(6), R is given by Eq.(5) and $R \cdot k_3$ is given by Eq.(7).

Once the position and the orientation of the pointing means 40 are known, the position on the display means 20 pointed by the opining means 40 can be calculated and is inputted into the computer as the position of the cursor 10. The calculation is done in real time with the computer or a dedicated DSP.

Figure 9D:
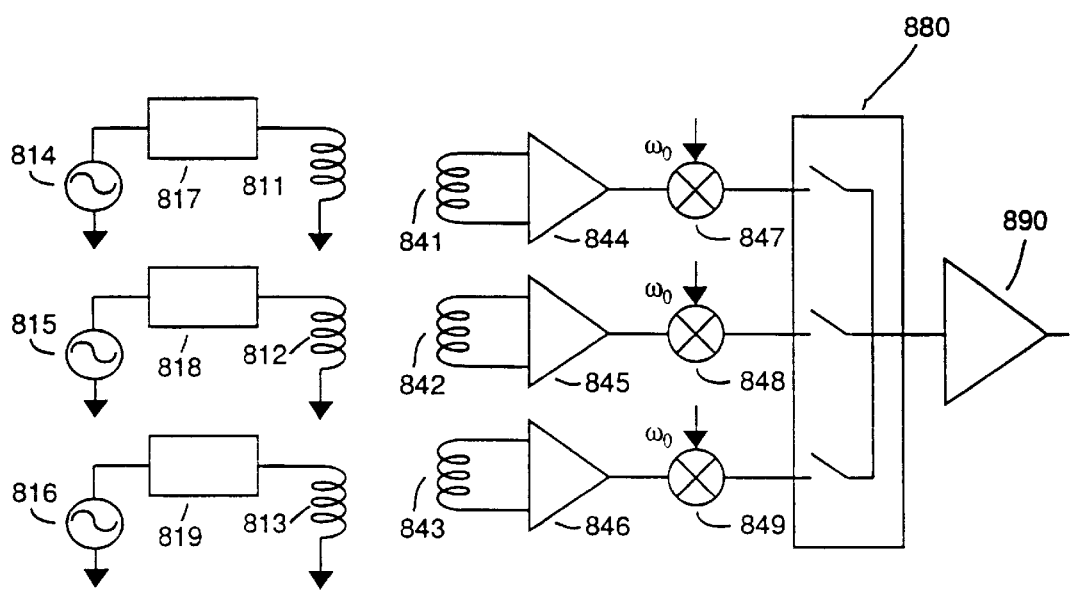
FIG. 9d shows the circuit to measure the magnetic coupling coefficients between the transmitter coils and receiver coils.

The nine magnetic coupling coefficients are measured by the electronics shown in FIG. 9d. The principle of the circuit is the same as that in the fifth embodiment, and is not repeated here. Three transmitter channels (involving 811, 812 and 813) and three receiver channels (involving 841, 842 and 843) are used to determine both the position of the transmitter set 810 and the orientation of the transmitter coil 813 in the receiver reference frame.

Figure 10:
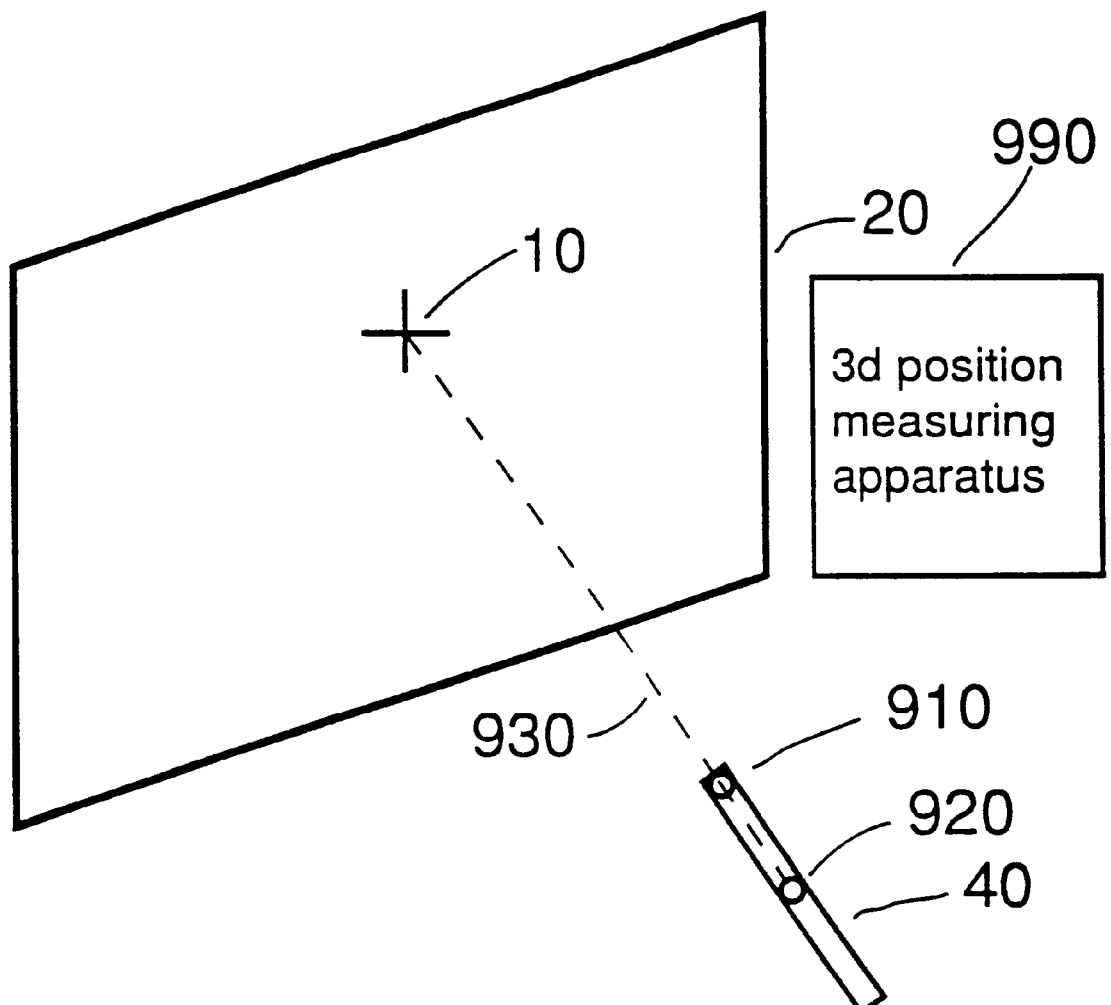
FIG. 10 shows that the positions of two reference points, which are connected by a reference line in the direction pointed by the pointing means, are measured by an apparatus in three dimensional space.

Among the eight selected embodiment described above, the forth, fifth, and sixth embodiment are special cases of a general embodiment. This general embodiment is illustrated in FIG. 10. In this embodiment, there are two reference points 910 and 920 fixed on the pointing means 40. The reference line 930 connecting the reference point 910 and reference point 920 is in the direction pointed by the pointing means 40. An apparatus 990, possibly (but not necessarily) with sensors fixed on the display means 20, is used to measure the positions of the reference points 910 and 920 in a three dimensional coordinate fixed relative to the display means 20. Once the positions of the reference points 910 and 920 are determined, the reference line 930 can also be calculated. Thus, the intersect point between the reference line 930 and the display means 20 can also be calculated, and the intersect point is inputted into the computer or interactive TV as the position of the cursor 10. The calculation is done in real time with the computer or with a dedicated DSP.

In this general embodiment, the reference points 910 and 920 can be visible light source, infrared source, sonic source or electromagnetic field source. The apparatus 990 can be any three dimensional digitizers or position measurement instruments based on light means, infrared means, sonic means or electromagnetic means.

IMPROVED EMBODIMENTS

The first improved optical embodiment uses a light beam and an optical imaging device to determine the position on the display means 20 pointed by the pointing means 40.

Figure 12A:
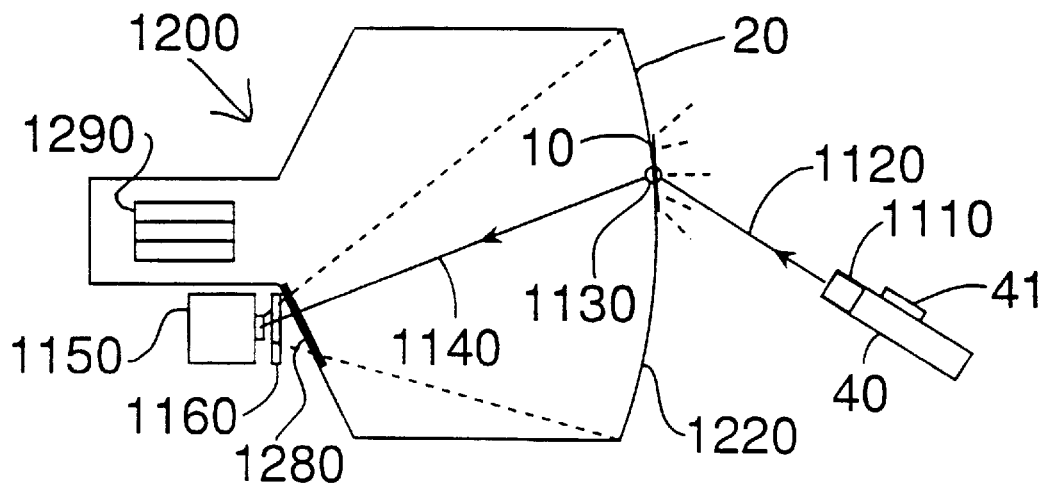
FIG. 12a shows that the light spot, on the screen of a CRT tube, created by a light beam from pointing means, is measured with an imaging device.

FIG. 12a shows the schematic of the first improved optical embodiment. In this embodiment, a light source 1110 is fixed on the pointing means 40. The light source 1110 generates a light beam 1120 in the direction pointed by the pointing means 40. The light beam projects a light spot 1130 on the display means 20. The position of the light spot 1130 is determined by an imaging device 1150. A band pass filter 1160 is preferred to be installed in front of the imagining device 1150.

The light source 1110 can be either visible or invisible. The light source 1110 is preferred to be monochromatic, and the filter 1160 is installed in front of the imaging device 1150 to improve the signal to noise ratio. If a band pass filter 1160 is used, it only allows the light with the same wavelength of the light source 1110 to enter the imaging device 1150. An invisible light source is more preferable than a visible light source, and near infrared light is the best choice. For infrared light source, a simple black glass can be used as the filter 1160.

Figure 12B:
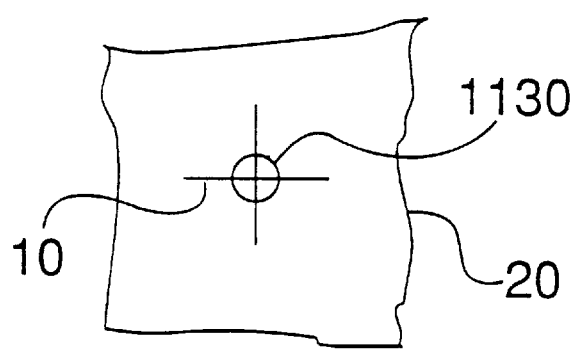
FIG. 12b shows the light spot on the screen of a CRT tube and the displayed cursor at the position of the light spot.

The position of the light spot 1130 is detected by the imaging device 1150. If the entire display area on the display means 20 is imagined by the imaging device 1150, every position on the display means 20 has one corresponding position on the image in the imaging device 1150. Thus, based on the image in the imaging device 1150, the position of the light spot 1130 can be determined. The imaging device 1150 can output the determined position directly into the computer 30 with properly designed electronics, or it can output the whole image into the computer 30 or a dedicated DSP and use the computer or the DSP to calculate the coordinate of the light spot 1130. The calculated coordinate is taken as the position of the cursor 10, as shown in FIG. 12b. The calculation is done in real time.

Figure 12C:
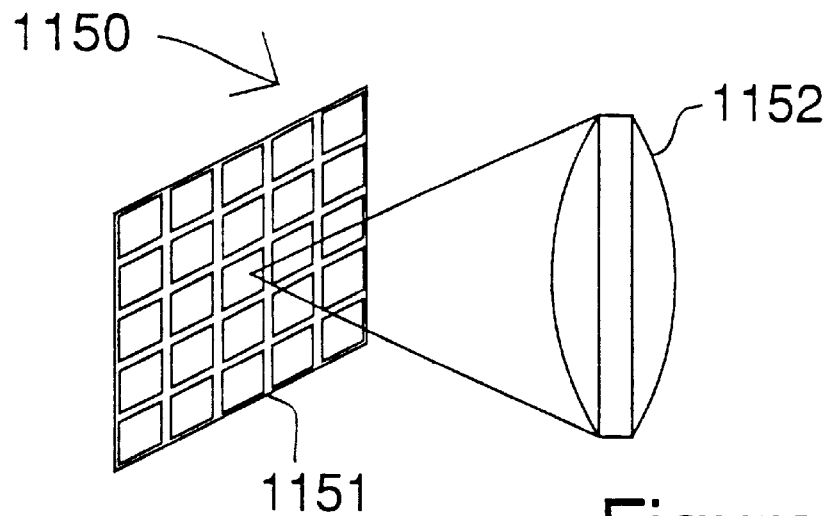
FIG. 12c shows that a video camera is formed by a lens and a two dimensional array of photodetectors.
Figure 12D:
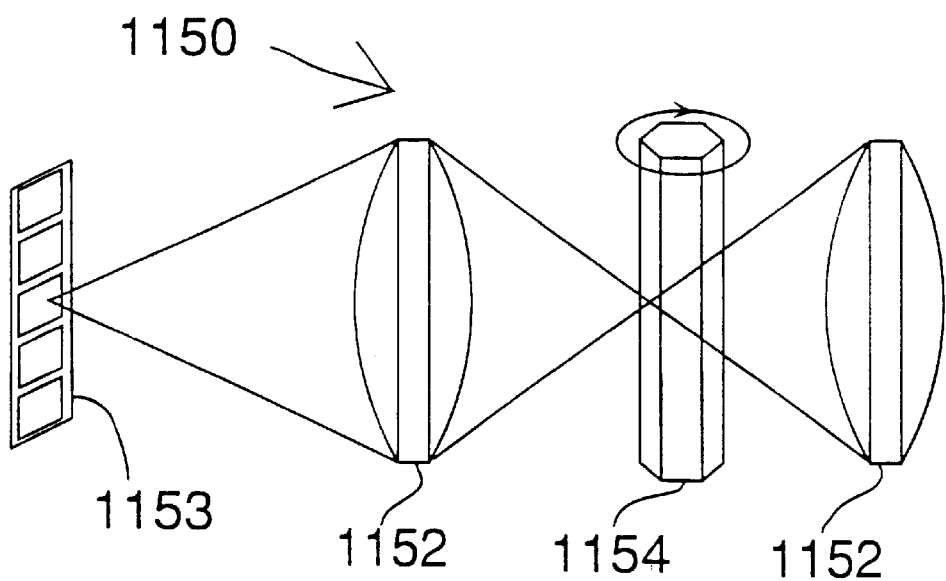
FIG. 12d shows that a video camera is formed by a lens, a rotating mirror and a one dimensional array of photodetectors.

The imaging device 1150 can be a video camera. The video camera can based on any two dimensional photodetector arrays 1151 through a lens system 1152 as shown in FIG. 12c. The video camera can also based on one dimensional photodetector arrays 1153 through a lens system 1152 with rotating mirror 1154 as shown in FIG. 12d. The one or two dimensional photodetector arrays (1151 or 1153) can be CCD arrays, photodiode arrays, phototransistor arrays, photodarlington arrays, or optical RAMs. CCD arrays is preferred in the current design, because it is readily available. If cheap optical RAMs is available, they are even more preferred, because photodetectors with gray level sensitivity are not required in the current design and photodetectors with only black and white sensitivity is adequate, and the read out electronics of an optical RAM is simpler than a CCD array.

In the case that the display means 20 is the screen 1220 of a CRT tube 1200, as shown in FIG. 12a, .if the CRT screen 1220 is made to be translucent for the light with the wave length of the light source 1110, then, the position of the light spot 1130 can be detected by the imaging device 1150 on the backside of the CRT screen 1220. With proper geometric design, a small imaging device 1150 and filter 1160 can be installed within the CRT tube without disturbing the electron beams from the electron guns 1290. An alternative design is to install a transparent window 1280—for the wavelength of the light source 1110—on the wall of the CRT tube 1200, and to have the imaging device 1150 and filter 1160 installed outside the CRT tube 1200, as shown in FIG. 12a.

Figure 13A:
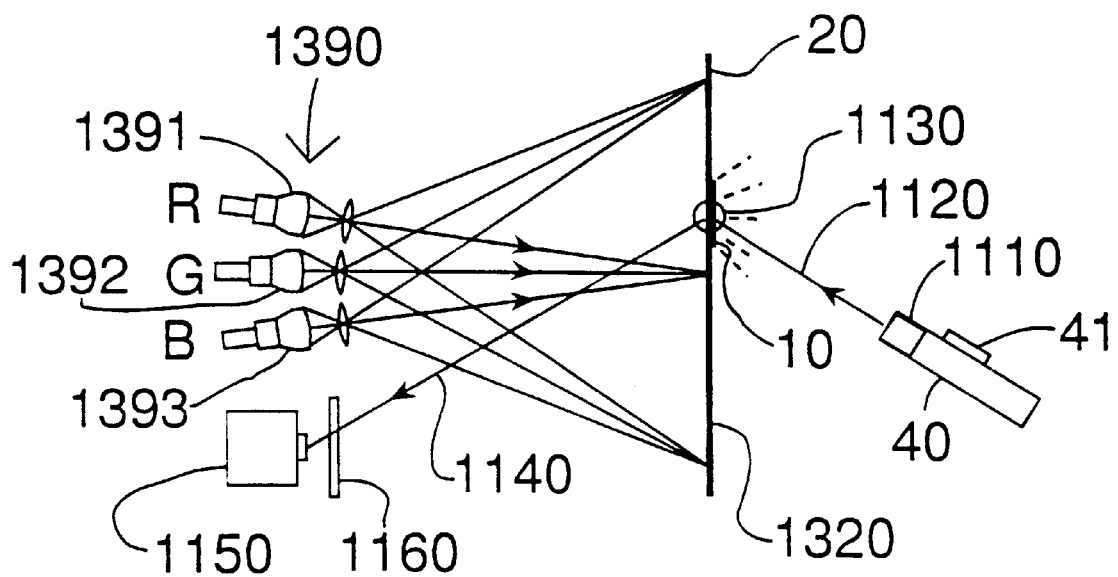
FIG. 13a shows that the light spot, on the screen of a projection monitor, created by a light beam from pointing means, is measured with an imaging device.
Figure 13B:
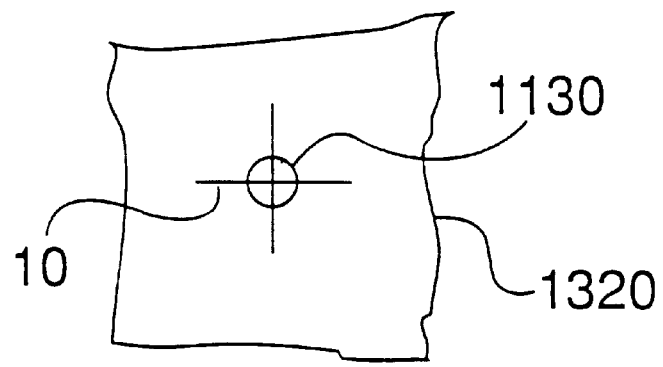
FIG. 13b shows the light spot on the screen of a rear projection monitor and the displayed cursor at the position of the light spot.
Figure 13C:
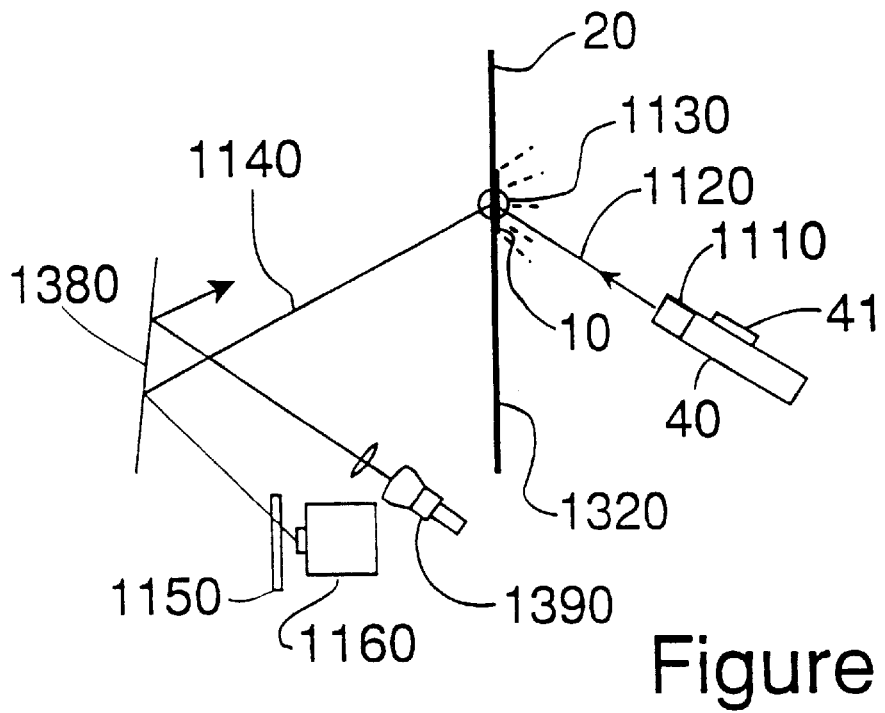
FIG. 13c shows that the light spot, on the screen of a projection monitor, created by a light beam from pointing means, is measured with an imaging device with additional optical elements.

In the case that the display means 20 is a rear projection monitor or rear projection TV screen 1320, the imaging device 1150 can be placed alongside with the three light guns 1390—including the Red gun 1391, the Green gun 1392 and the Blue gun 1393, as shown in FIG. 13a. The position of light spot 1130 on the projection screen 1320 is inputted into the computer 30 and displayed as the cursor position 10, as shown in FIG. 13b. In a typical rear projection system, as shown in FIG. 13c, the light guns 1390 do not project the light beams onto the screen 1320 directly, but through some optical systems—such as mirrors in order to save space for the monitor; in this kind of system, the light spot 1130 can also be detected by the imaging device 1150 through some additional optical systems 1380, which may or may not be the same optical system for the light guns.

Figure 13D:
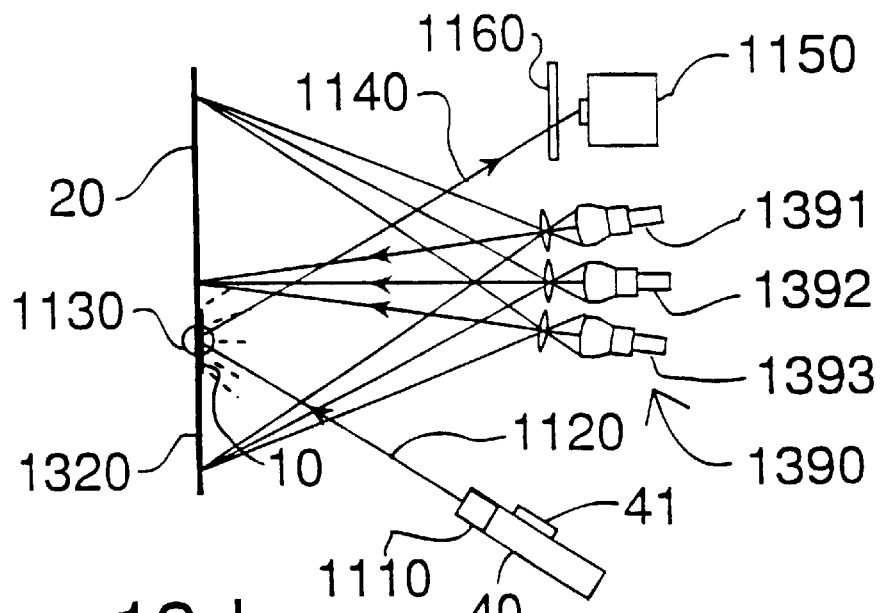
FIG. 13d shows that the light spot, on the screen of a front projection monitor, created by a light beam from pointing means, is measured with an imaging device.

In the case that the display means 20 is a front projection monitor or front projection TV screen, as shown in FIG. 13d, the imaging device 1150 can be placed alongside with the three light guns 1390—including the Red gun 1391, the Green gun 1392 and the Blue gun 1393—in the front end of the display screen 1320. Some additional geometric arrangements of the light imaging devices 1150 are also possible. For example, the imaging device 1150 can be placed in the rear end of the display screen 1320 for a front projection monitor, or the imaging device 1150 can be placed in the front end of the display screen 1320 for a rear projection monitor.

At present, this first improved optical embodiment, which uses an imaging device to determined a light spot, is the most preferred embodiment for a remote pointer, and offers the best performance and the cheapest manufacture cost.

The second improved optical embodiment use a light scope—which can be alternatively called as a long range light pen—to determine the position on the display means 20 pointed by the pointing means 40.

A light scope is basically a light pen working at a distance from a display screen. Light scopes were invented for video game applications, and some of light scope embodiments are described in U.S. Pat. Nos. 5,401,025, 5,340,115, 4,923,401, and the references cited therein. In this disclosure, the basic principle of a light scope is described briefly.

Figure 14:
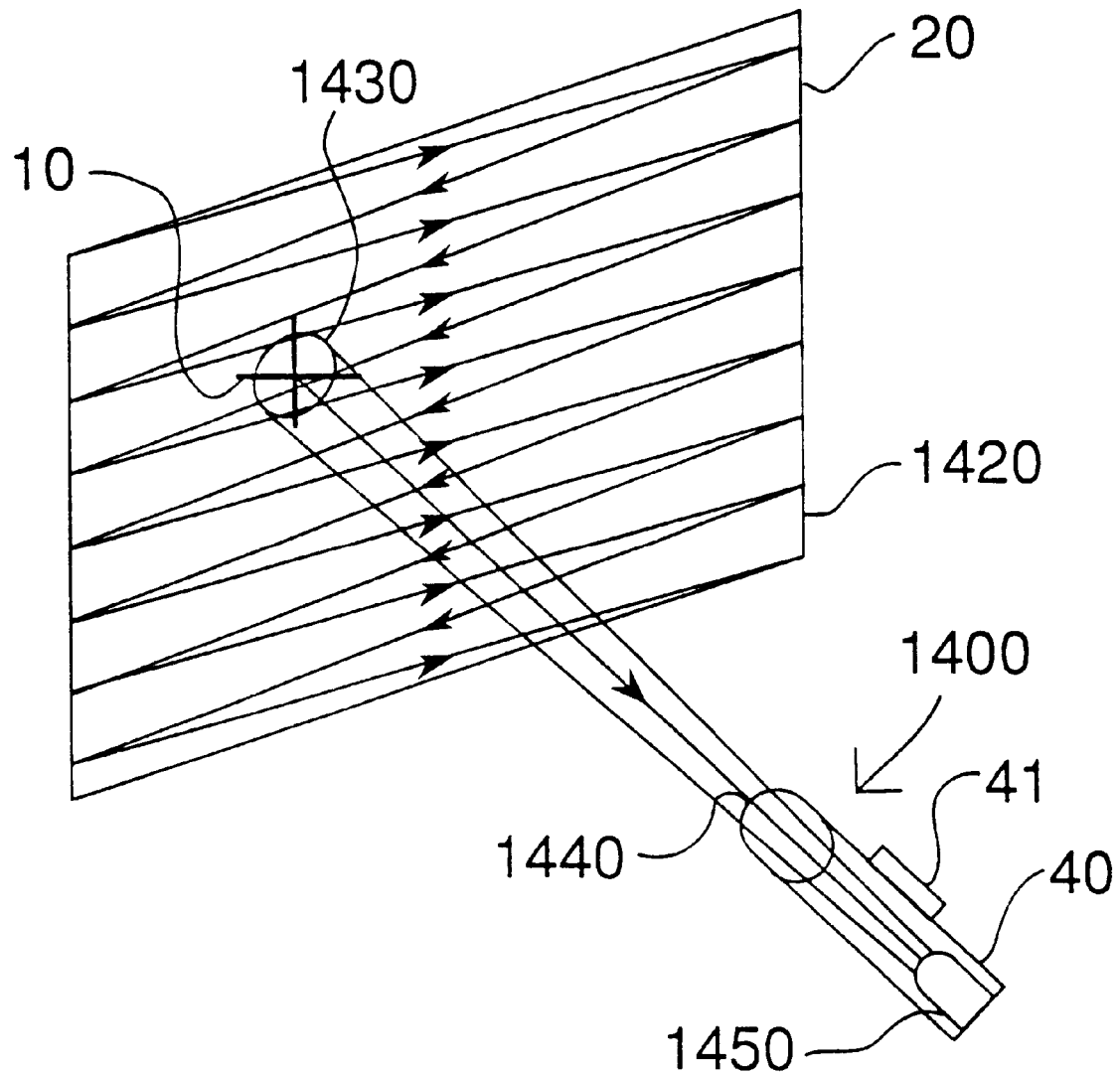
FIG. 14 shows that the position on display means is measured with a light scope.

As shown in FIG. 14, a light scope mainly consists of a lens system 1440 and photo detecting means 1450. The light detecting means 1450 can be a photodiode, a phototransistor or a photodarlington. The lens system 1440 defines a very narrow field of view. Only the light from a small area 1430 on a display means 20 are within the narrow field of view, and only the light from those areas is able to enter the light scope 1400. The light from the sensing area 1430 is detected by the light detecting means 1450. The display means 20 is usually the screen of a CRT tube or the screen of a projection display. The imaging on the display screen 1420 is displayed by scanning the screen line by line with electron guns (as in the case of a CRT tube) or light guns (as in the case of a projection screen), and every full imaging is scanned in less than 1/30 second. The time when the light from the sensing area 1430 is emitted can be determined by the light signal in the light detecting means 1450. By comparing this measured time with the synchronization signal for the imaging scanning, the position (or coordinates) of the sensing area 1430 can be determined. The determined position is inputted into a computer or a game machine. In video game applications, the light scope is aligned with the barrel of a game gun. The position on the display screen pointed by the gun, or actually pointed by the light scope, is not displayed; only when a user trigger the game gun, the position pointed by the gun is displayed as an simulated impact of a bullet. The action signal of the trigger is usually input into the computer through a cable.

A light scope can be easily modified to become a remote pointer for interactive TVs. To use a light scope as a remote pointer, the light scope is used as the pointing means 40 of the remote pointer. The position on the display means 20 pointed by the pointing means 40 is the position of the sensing area 1430. The sensing area 1430 is determined the same way as in the game gun application, and that determined position is inputted into the computer 30 in real time. But, the difference here is that the position on the display means 20 pointed by the pointing means 40 is always displayed as a cursor 10, as shown in FIG. 14. One (or several) selection button(s) 41 is added to the pointing means 40 to emulate the action of mouse buttons. The action of the selection button(s) 41 is inputted into the computer 30 wirelessly by coding the selection button signals with infrared or electromagnetic waves; it can also be input into the computer 30 though a cable.

All the embodiments for light scopes can be modified to become an embodiment for a remote pointer. But all the light scopes and light pens have one common problem: If the area they are pointed at is too dark, they can not determine that pointed position accurately because the photo signals entering a light scope or a light pen is too weak. This problem can be overcome with a new invention called interactive monitor.

An interactive monitor, as an improvement of the conventional monitor, not only display conventional visible images but also display invisible images which is mainly used for light scopes or light pens to interact with the monitor more effectively.

Figure 15A:
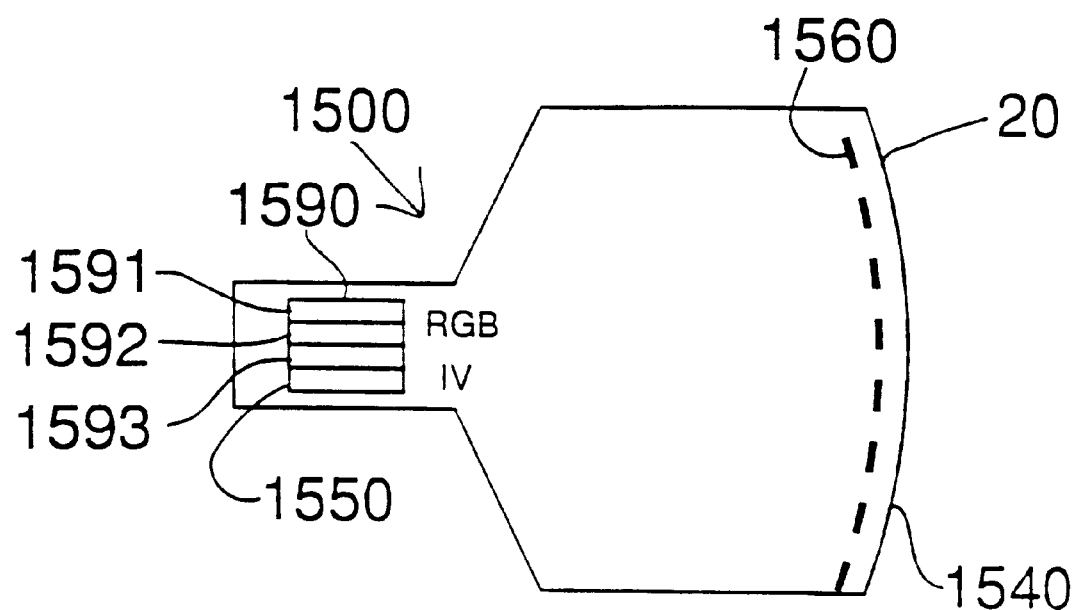
FIG. 15a shows that a conventional color CRT tube is improved by adding an additional electron gun for displaying invisible light images on the CRT screen.

FIG. 15*a* shows the schematic of an interactive CRT monitor 1500. In a conventional color CRT tube, the color imaging are created by three electron guns 1590—including guns 1591, 1592 and 1593. Through a mask 1560, each of the guns only shoot at one color of phosphors on the CRT screen. For example, electron gun 1591 only shoot at the Red phosphors, electron gun 1592 only shoot at the Green phosphors, and electron gun 1593 only shoot at the Blue phosphors. Color imaging are created by the combination of these three imaging. In an interactive monitor, one or more electron guns are added, and through the mask 1560, each of these new guns shoot at one kind phosphors which emit only invisible light. Different guns shoot at different type of phosphors emitting different wavelength of invisible light. In FIG. 15*a*, only one electron gun 1550 for invisible light is shown.

Figure 15B:
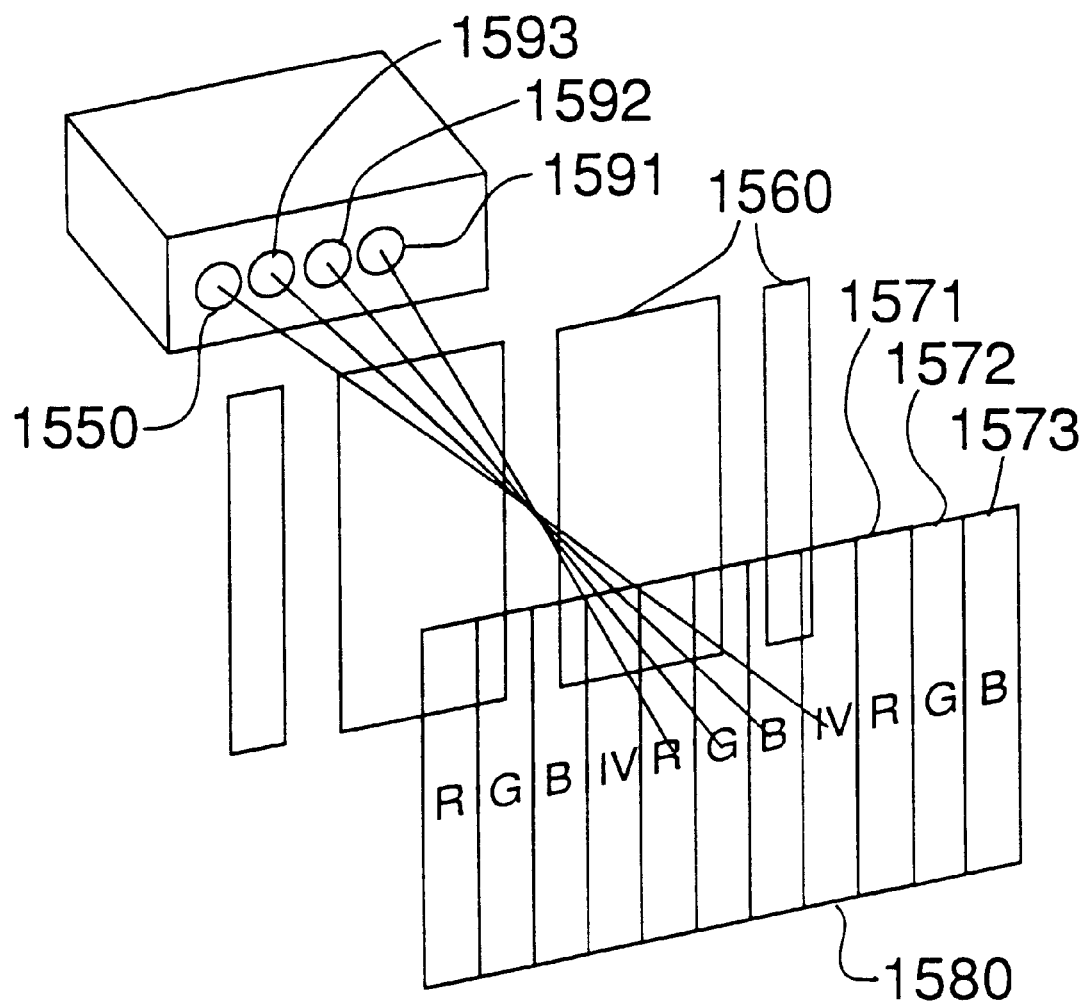
FIG. 15b shows that a conventional Trinitron CRT tube is improved for displaying invisible light images on the CRT screen.

All the current designs of RGB-CRT tubes can be easily modified to display one or more invisible "colors". FIG. 15*b* shows a modification of the famous Trinitron tube with one invisible "color". In this modification, a forth electron gun 1550 is placed alongside with the original three electron guns 1591, 1592 and 1593. The geometry of the mask 1560 is pretty much the same as the original Trinitron. Other than the original three kind phosphors strips—the Red strip 1571, the Green strip 1572 and the Blue strip 1573, one more phosphors strip 1580 emitting invisible light is added on the display screen. The electron gun 1550 only shoot at this invisible light phosphors 1580. Thus, in additional to the visible color image, an additional invisible "color" image can also be displayed at the same time. The extension to the case of displaying more than one invisible "color" is straight forward. For example, by placing a fifth electron gun alongside with the previous four guns and by adding an additional kind of phosphors strip emitting different wavelength than that of the phosphors strip 1580, two invisible "colors" can be displayed at the same time along with the original three visible colors.

Figure 15C:
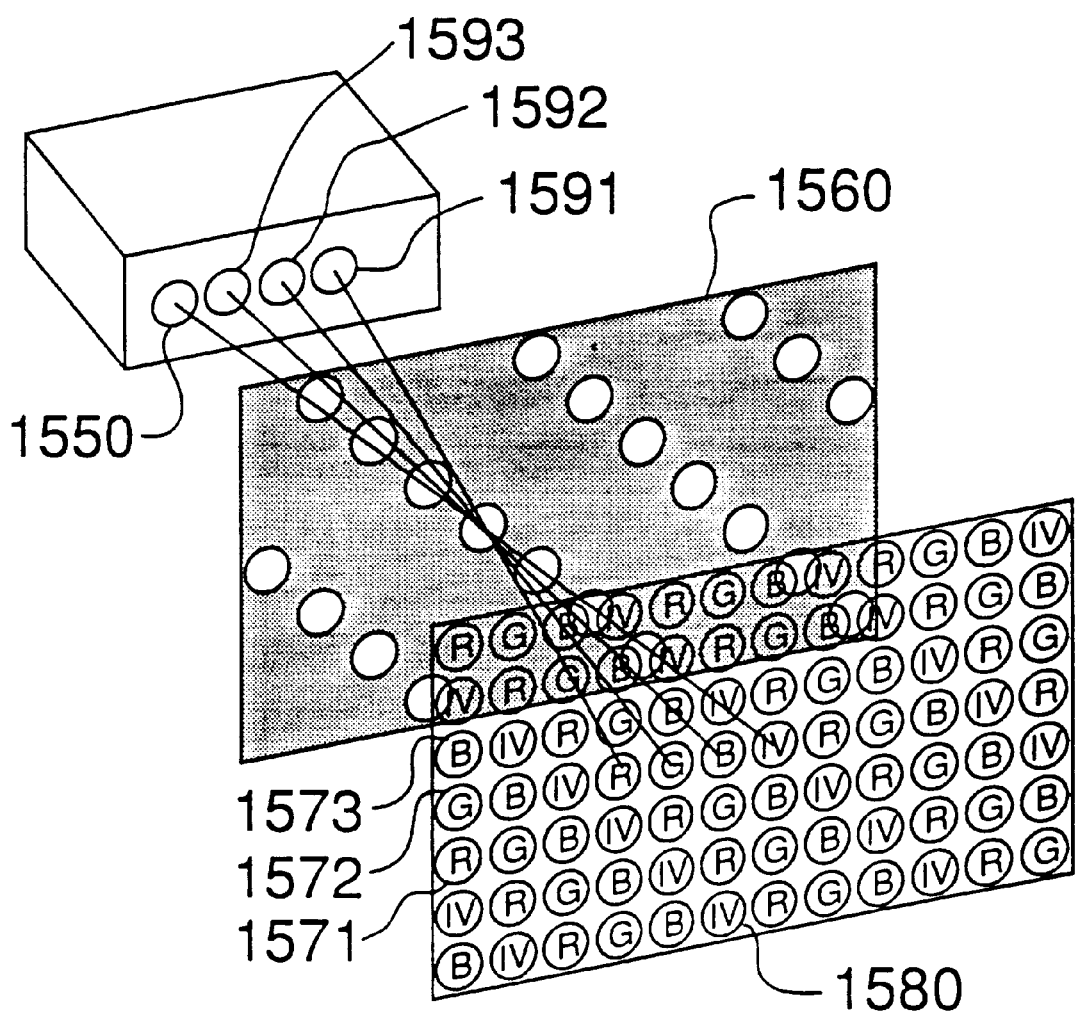
FIG. 15c shows that a conventional shadow mask CRT tube is improved for displaying invisible light images on the CRT screen.
Figure 15D:
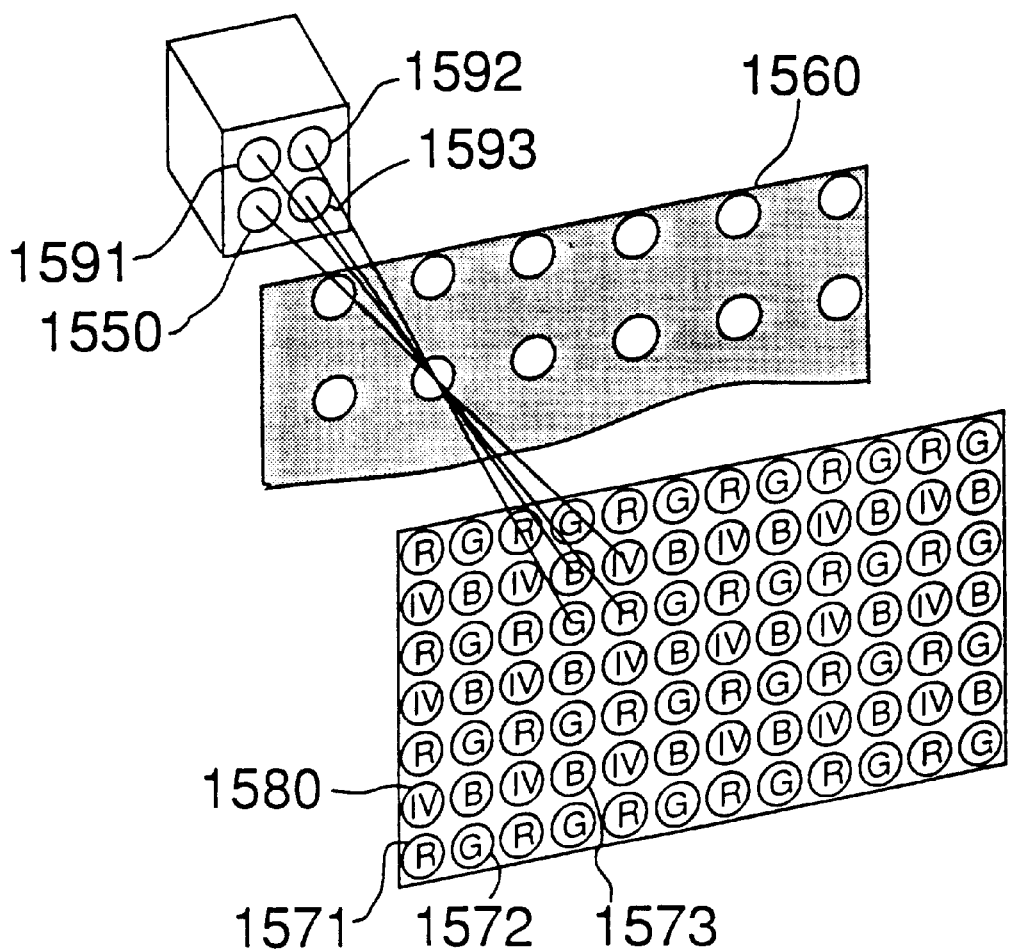
FIG. 15d shows that a conventional shadow mask CRT tube, with electron guns closely packed, is improved for displaying invisible light images on the CRT screen.

FIG. 15*c* shows a modification of the shadow mask design of CRT tubes with one invisible "color". In this modification, a forth electron gun 1550 is placed alongside with the original three electron guns 1591, 1592 and 1593. Other than the original three kind phosphors dots—the Red dot 1571, the Green dot 1572 and the Blue dot 1573, one more kind of phosphors dots 1580 emitting invisible light is added on the display screen. The electron gun 1550 only shoot at this invisible light phosphors 1580. Thus, in additional to the visible color image, an additional invisible image can also be displayed at the same time. The extension to the case of displaying more than one invisible "colors" is straightforward. And other geometric arrangement of the electron guns and phosphor dots are also possible. For example, FIG. 15*d* shows a more packed design of the four electron guns, and corresponding layout of phosphors dots.

Figure 15E:
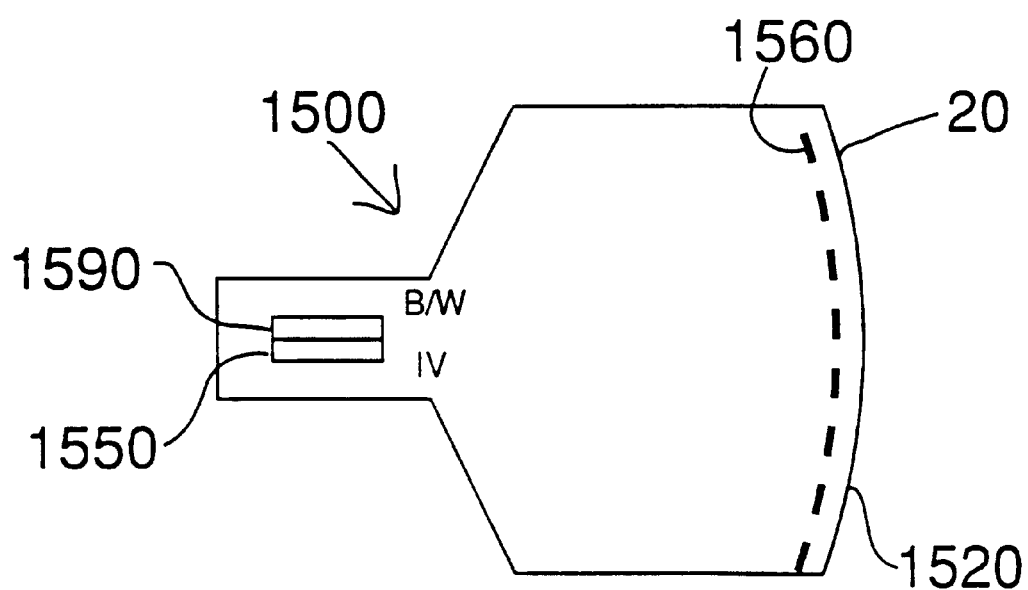
FIG. 15e shows that a black and white CRT tube is improved by adding an additional electron gun for displaying invisible light images on the CRT screen.

Based on the above teachings, interactive monitor with monochromatic display can also be designed. FIG. 15*e* shows a design with one visible color (e.g. black and white in gray scale) and one invisible "color". In this design, two electron guns are installed. One electron gun 1590 is for the visible light and one electron gun 1550 is for the invisible light.

Figure 16A:
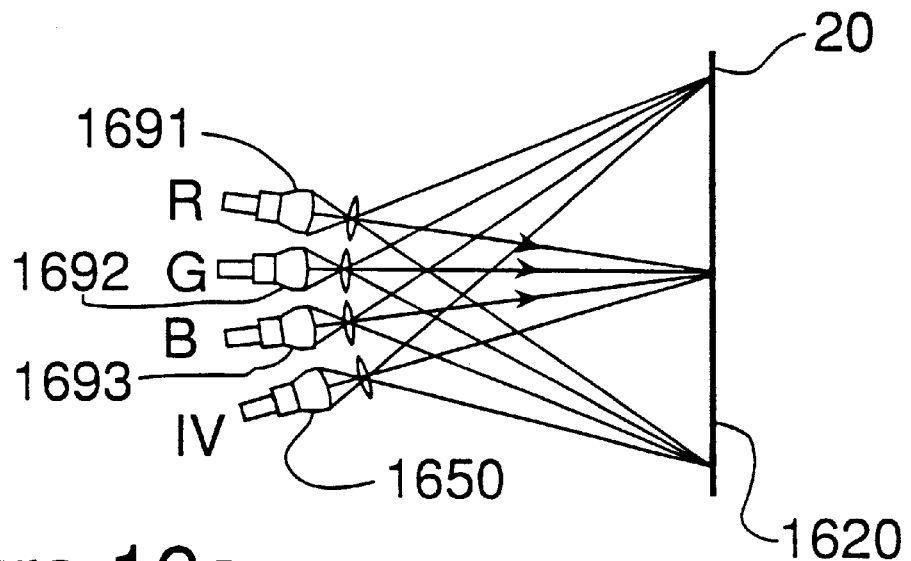
FIG. 16a shows that a conventional rear projection monitor is improved for displaying invisible light images on the screen, by adding a light gun for the invisible light.
Figure 16B:
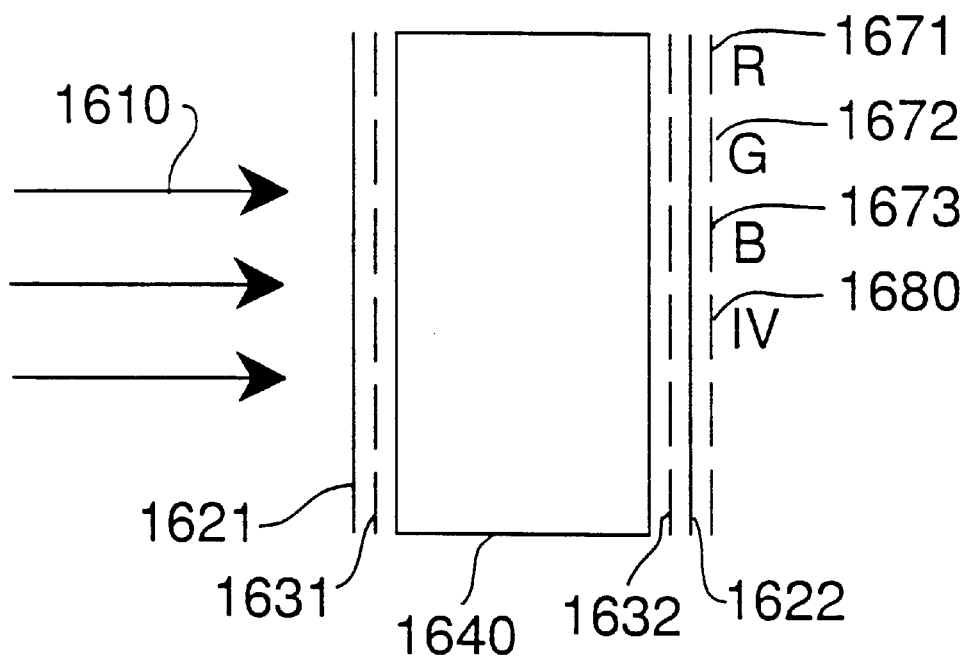
FIG. 16b shows that a conventional liquid crystal display is improved for displaying invisible light images on the screen, by adding invisible light filters.

Other types of conventional monitors can also be easily modified to become interactive monitors with the capability of displaying invisible images. For a projection monitor with three color light guns(1691, 1692 and 1693), as shown in FIG. 16*a*, to display one "color" of invisible images, a forth invisible light gun 1650 is added along with the original three guns. For a LCD display or a LCD projector, as shown in FIG. 16*b*, the three primary colors are created with three different band pass filters—1671 for the Red, 1672 for the Green and 1673 for Blue, the invisible images is created with a forth band pass filter 1680. In FIG. 16*b*, 1621 and 1622 are polarizes, 1631 and 1632 are transparent conducting grids and 1640 is liquid crystal; the primary colors are created by passing white light 1610 through the band pass filters 1671, 1672 and 1673, and the invisible "color" is created by passing the "white light" 1610 though the band pass filter 1680 which pass only the invisible light at designed wave length; here the "white light" 1610 has spectra component in the wavelength of the invisible light.

Based on the above teachings, the changing of other types of displays to interactive monitors is straightforward for the people skilled in the arts, since most of the principle of displaying three primary visible colors can be easily extended to display additional invisible "colors" at the same time. If the primary visible colors are created by different phosphors—as in CRT, FED, plasma and electroluminance displays, then, invisible "colors" can be created with additional phosphors emitting invisible light. If the primary visible colors are created with band pass filters—as in LCD displays, then, invisible "colors" can be created with additional band pass filters for invisible lights.

Using the current invention of interactive monitors, better remote pointers and game guns can be constructed. Interactive monitors is designed to use with light scopes or light pens.

Figure 17A:
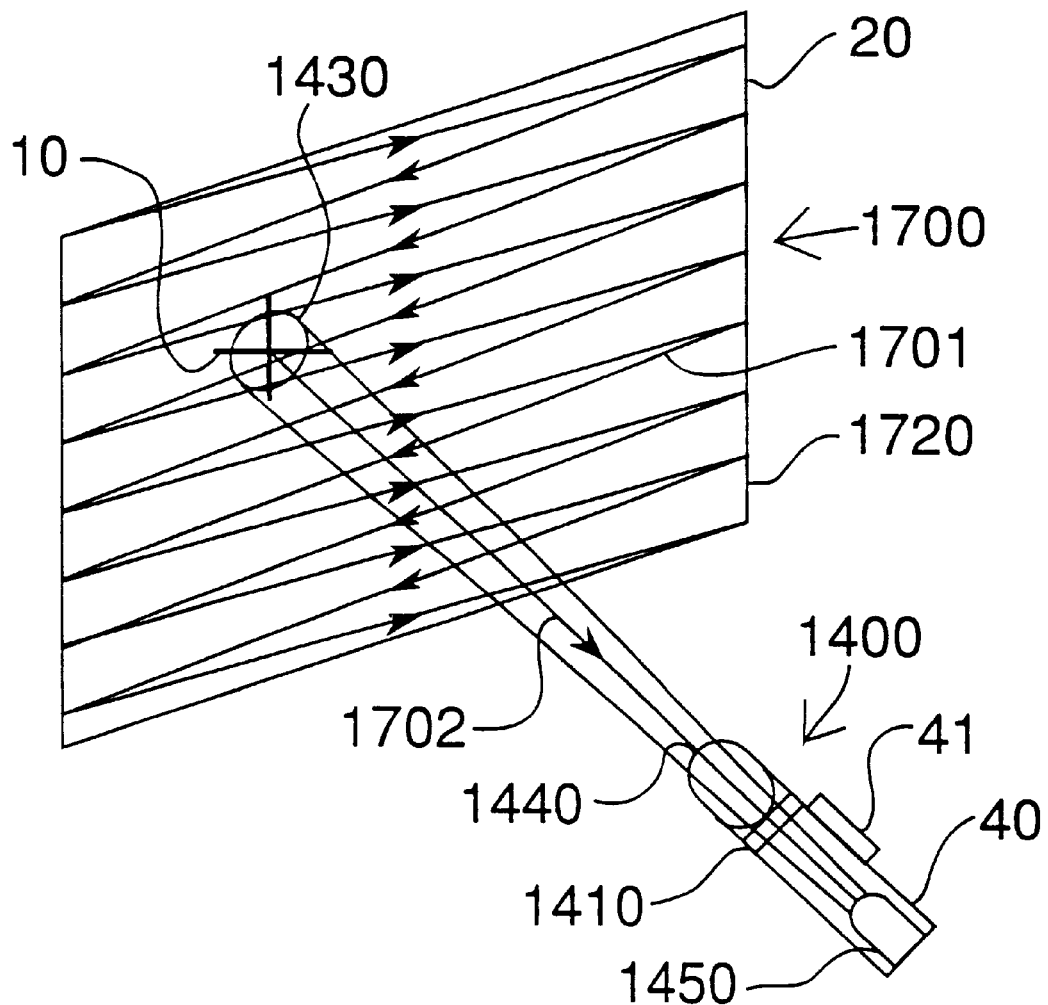
FIG. 17a shows that an interactive monitor is used with a light scope.

To make a remote pointer, a light scope 1400 is used as the pointing means 40 of the remote pointer, and the position on the display means 20 pointed by the pointing means 40 is the position of the sensing area 1430 of the light scope 1400, as shown in FIG. 17a. The position (or coordinates) of the sensing area 1430 on the screen of an interactive monitor 1700 can be determined more effectively than a conventional monitor. The determined position 1430, which is just the position on the display means 20 pointed by the pointing means 40, is inputted into the computer 30 and displayed as the position of the cursor 10. One (or several) selection button(s) 41 is added to the pointing means to emulate the action of mouse buttons. The action of the selection button (s) 41 is inputted into the computer 30 either though a cable or wirelessly by coding the selection button signals with infrared or electromagnetic waves.

To make a game gun, a light scope 1400 is aligned with the barrel of a game gun. The position pointed by the gun, which is the sensing area 1430 of the light scope, can be determined more effectively with the help of the interactive monitor 1700. The determined position 1430 is inputted into the computer or the video game machine, and when the trigger is triggered, that determined position is displayed as the impact position of a bullet.

Three ways of determining the sensing area 1430 of a light scope or a light pen on the screen of an interactive monitor are described in this disclosure.

FIG. 17a shows the first way of using an interactive monitor to determine the sensing area 1430 of the light scope 1400. The interactive monitor 1700 is used pretty much the same way as a conventional monitor to determine the position of the sensing area 1430., except that the invisible light from the interactive monitor 1700 is used to determine the position of the sensing area 1430. The interactive monitor 1700 scans the visible images and invisible images 1701 at the same time. In the current mode of operation, the invisible image is simply a blank "white" page, with all pixels of the invisible light in high intensity. The invisible light 1702 from the sensing area 1430 on the interactive monitor 1700 is detected with the light scope 1400. A band pass filter 1710 is installed in the light scope 1400 to allow only those light at the same wavelength as the invisible light from the interactive monitor 1700 to enter the photo detecting means 1450. The filter 1710 is used to maximize the signal to noise ratio. The time when the light from the sensing area 1430 is emitted can be measured by the light signal in the light detecting means 1450. By comparing this measured time with the synchronization signal for the image scanning, the position (or coordinates) of the sensing area 1430 can be determined. The determined position is inputted into the computer 30. In the case of a remote pointer, that determined position is displayed as the position of the cursor 10. And in the case of a game gun, when the trigger is trigged, that determined position is displayed as the impact position of a bullet. Because all the pixels of the invisible light is in high intensity, all the positions on the screen of an interactive monitor can be determined accurately, thus, solving the long standing "dark spot" problem of conventional monitors when they are used with light pens and light scopes.

Figure 17B:
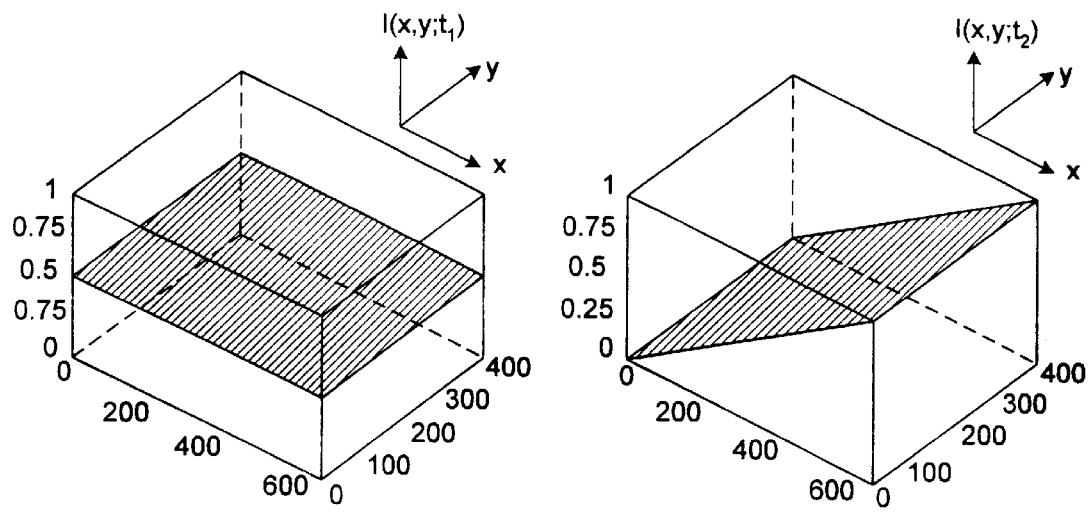
FIG. 17b shows two intensity distributions of the flushed images, one with uniform distribution and one with x-gradient, used for determining the position on the display means pointed by a light scope.

FIG. 17b shows the second method of using an interactive monitor to determine the sensing area 1430 of the light scope 1400. This second way uses the timing information of the light signal in the light scope 1400 to determine the y coordinate of the sensing area 1430, but uses intensity information of the light signal to determine the x coordinate of the sensing area 1430.

In the previous operation mode, the interactive monitor flushes the screen with all pixels in high intensity $I_0$, and the light scope measures the intensity of light from the sensing area as a function of time. Based on this light signal (which is a function of time) and by comparing with the synchronization signal of the image scanning, both the x and the y coordinates of the sensing area 1430 can be determined. The y coordinate is easier to determine than the x coordinate, because the timing of the light signal need to be measured much more accurately to determine the x coordinate than to determine the y coordinate. With a moderate accuracy in measuring the timing of the light signal, only y coordinate can be determined accurately, and the x coordinate may suffer big measurement error.

To improve the measurement accuracy of the x coordinate, the interactive monitor flushes the screen two times with invisible images for every measurement of x and y coordinates. First, the interactive monitor flushes the screen starting at time t1 with a "white" blank image with all invisible light pixels in high intensity $I_0$, and the intensity at the position with coordinate $x_0$ and $y_0$ (measured in unit of pixel) is $I(x_0,y_0;t_1)=I_0$. The light signal of the invisible light in the light scope will be $S_1(t)=I_0 f(t-t_1)$, where $f(t-t_1)$ is a response function. Based on the time $t_1^*$ at which the light signal $S_1(t)$ is maximum ($dS_1(t)/dt=0$ for $t=t_1^*$), both x and y coordinates of the sensing area 1430 can be determined. Here, $y\ t_1^* - t_{1\ and\ x\ t1}^* - Ty$ with T being the time it takes to make one line of horizontal scan. The measured y coordinate is saved, but the x coordinate is disregarded and measured again more accurately with the next flush of the monitor screen. To measure the x coordinate, the interactive monitor flush the screen with an invisible image again starting at time $t_2$ with an invisible light image which is uniform in y direction but has an intensity gradient in the x direction, as shown in FIG. 17b. For example, the intensity of the invisible light at the position with coordinate $x_0$ and $y_0$ (measured in unit of pixel) may have the functional form $I(x_0,y_0;t_2)=I_0 x_0/N_x$, where $N_x$ is the total number pixels in each horizontal line. Now, the light signal of the invisible light in the light scope will be $S_2(t)=(I_0 x/N_x)f(t-t_2)$. Assume that time $t_2^*$ is the time at which the light signal $S_2(t)$ is maximum ($dS_2(t)/dt=0$ for $t=t_2^*$), then, the ratio of the maximum of the two signals gives the x coordinate of the sensing area 1430, $x=N_x S_2(t_2^*)/S_1(t_1^*)$. If the intensity of the two light signals can be measured accurately, then the x coordinate can also be measured accurately. With two flushes for every position measurement of the sensing area 1430, the coordinates of the sensing area 1430 in the computer memory will be updated at 30 Hz, if the screen of the interactive monitor is displayed with 60 Hz repetition rate. In this method, the monitor only need to be in line scanning mode (as in LCD or plasma displays), compared with the first method—conventional method—in which point scanning mode (as in CRT tube) must be used.

Figure 17C:
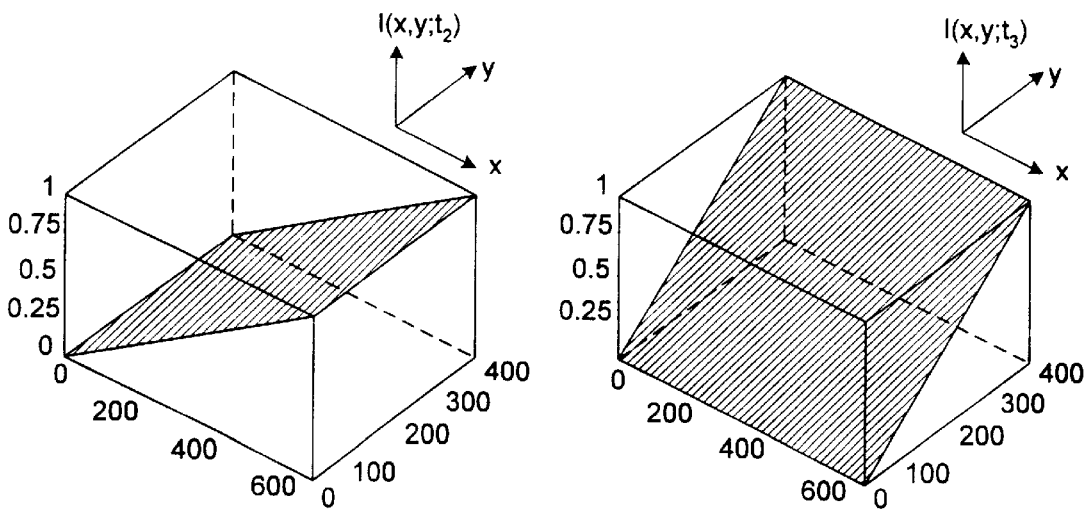
FIG. 17c shows two intensity distributions of the flushed images, one with x-gradient and one with y-gradient, used for determining the position on the display means pointed by a light scope.

FIG. 17c shows the third method of using an interactive monitor to determine the sensing area 1430 of the light scope 1400. This third way uses intensity information of the light signal to determine both the x and y coordinates of the sensing area 1430. In this operation mode, the interactive monitor flushes the screen three times with invisible imaging for every measurement of x and y coordinates. First, the interactive monitor flushes the screen starting at time t1 with a "white" blank image with all invisible light pixels in high intensity $I_0$, and the intensity at the position with coordinate $x_0$ and $y_0$ (measured in unit of pixel) is $I(x_0,y_0;t_1)=I_0$. The light signal of the invisible light in the light scope will be $S_1(t)=I_0 f(t-t_1)$, and at time $t_1^*$ the light signal $S_1(t)$ is maximum. Then, the interactive monitor flush the screen with invisible image again starting at time $t_2$ with an invisible light imaging which is uniform in y direction but has an intensity gradient in the x direction, as shown in FIG. 17c. For example, the intensity of the invisible light at the position with coordinate $x_0$ and $y_0$ (measured in unit of pixels) may have the functional form $I(x_0,y_O;t_2)=I_0 x_0/N_x$, where $N_x$ is the total number pixels in each horizontal line. Now, the light signal of the invisible light in the light scope will be $S_2(t)=(I_0 x/N_x)f(t-t_1)$. Assume that time $t_2^*$ is the time at which the light signal $S_2(t)$ is maximum, then, the ratio of the maximum of the two signals gives the x coordinate of the sensing area 1430, $x=N_x S_2(t_2^*)/S_1(t_1^*)$. To determine the y coordinate, the interactive monitor flush the screen with an invisible image for the third time starting at time $t_3$ with an invisible light image which is uniform in x direction but has an intensity gradient in the y direction, as shown in FIG. 17c. For example, the intensity of the invisible light at the position with coordinate $x_0$ and $y_0$ (measured in pixels) may have the functional form $I(x_0,y_0;t_3)=I_0 y_0/N_y$, where $N_y$ is the total number pixels in each vertical line. Now, the light signal of the invisible light in the light scope will be $S_3(t)=(I_0 y/N_y)f(t-t_3)$. Assume that time $t_3^*$ is the time at which the light signal $S_3(t)$ is maximum, then, the ratio of the maximum of the two signals $S_3(t)$ and $S_1(t)$ gives the y coordinate of the sensing area 1430, $y=N_y S_3(t_3^*)/S_1(t_1^*)$. With three flushes for every position measurement of the sensing area 1430, the coordinates of the sensing area in the computer memory will be updated at 20 Hz, if the screen of the interactive monitor is displayed with 60 Hz repetition rate. In this method, the monitor dose not have to be in any scanning mode, and line scanning or point scanning mode works equally well.

In the above methods of using intensity information to determine the x coordinate, a flushed image with x intensity gradient is used, and the intensity of the flushed image at a position with x-coordinate $x_0$ and y-coordinate $y_0$ is of functional form $I(x_0,y_0;t_2)=I_0 x_0/N_x$. Other kind of intensity function of x gradient can also be used, for example, $I'(x_0,y_0;t_2)=I_0(x_0+b)/(N_x+b)$, with b being a positive number. If this intensity function is used, the formula in determining the x coordinate, $x=N_x S_2(t_2^*)/S_1(t_1^*)$, is changed into a new form, $x=(N_x+b)S_2(t_2^*)/S_1(t_1^*)-b$. Similarly, Other kind of intensity function of y gradient can also be used, for example, $I'(x_0,y_0;t_3)=I_0(y_0+c)/(N_x+c)$, with c being a positive number. The people skilled in the art might like to use intensity functions of their choice, other than the example intensity functions given in this disclosure.

The methods of using intensity information to determine the coordinates of the sensing area 1430 can also be applied to conventional displays, and in this case, the flushed images will be in visible light range. Those flushed images, $I(x_0,y_0;t_1)$ $I(x_0,y_0;t_2)$ and/or $I(x_0,y_0;t_3)$ can be inserted into the sequences of the normal visual display images. Taking a specific example, assume the original display is flushed at 90 Hz, or in other words, 90 frames is displayed in a second. One can use, say, 15 frames to display $I(x_0,y_0;t_1)$ and 15 frames to display $I(x_0,y_0;t_2)$, then, the remaining 60 frames can be used to display the normal visual imaging. If intensities $I(x_0,y_0;t_1)$ and $I(x_0,y_0;t_2)$ are not too strong, then, they might not severely degrade the quality of the normal visual imaging. The 15 intensity pairs of $I(x_0,y_0;t_1)$ and $I(x_0,y_0;t_2)$ can be used to determine the coordinates of the sensing area 1430 15 times in a second, by using intensity information to determine the x-coordinate and timing information to determine the y-coordinate, as described previously in the second method of using interactive monitors (However, no invisible imaging is used here). As an alternative, one can also use, say, 10 frames to display $I(x_0,y_0;t_1)$, 10 frames to display $I(x_0,y_0;t_2)$ and 10 frames to display $I(x_0,y_0;t_3)$, then, the remaining 60 frames can be used to display the normal visual imaging. The 10 intensity triplets—$I(x_0,y_0;t_1)$, $I(x_0,y_0;t_2)$ and $I(x_0,y_0;t_3)$—can be used to determine the coordinates of the sensing area 1430 10 times in a second, by using intensity information to determine both the x and y coordinates, as described previously in the third method of using interactive monitors (And again, no invisible imaging is used here). These intensity coding images—$I(x_0,y_0;t_1)$, $I(x_0,y_0;t_2)$ and/or $I(x_0,y_0;t_3)$—can be displayed less frequently or more frequently than the example display frequencies described above. The less frequent the intensity coding images are displayed, the less degrading they are to the normal visual images. But, the more frequent the intensity coding images are displayed, the more often the x and y coordinates are updated.

In all the above three methods, to calculate the coordinates of the sensing areas 1430, the light scope need to send to the computers the information about the light signals in the light scope—both timing and intensity information. In the case that the light scope is connected with the computer through a cable, such exchange of information is straight forward. But, in the case the light scope is not connected with the computer through cables, the exchange of information requires that the light signals are sent in inferred or electromagnetic waves by using transmitters and receivers—this kind of design is also straight forward for the people skilled in the art.

If a light scope is used with a conventional display in a conventional way, in which both the x and y positions of the sensing areas are determined by the timing of the light signals in the light scope without using invisible light images. The "dark spot" problem—a light scope can not determines the coordinates of a sensing area which is too dark—can be improved by using a light scope with good sensitivity. And if a light scope is used with a conventional display, with the x coordinate or both the x and y coordinates determined by flushed images whose intensities are coded with x or y gradient, a light scope with good sensitivity enables those intensity coded images to be flushed less frequently, and thus, makes the normal visual images less degraded. And a light scope with good sensitivity also makes it possible to maker that light scopes with smaller diameters. Therefore, a light scope with good sensitivity has many advantages, compared with its less sensitive counter part.

Figure 18A:
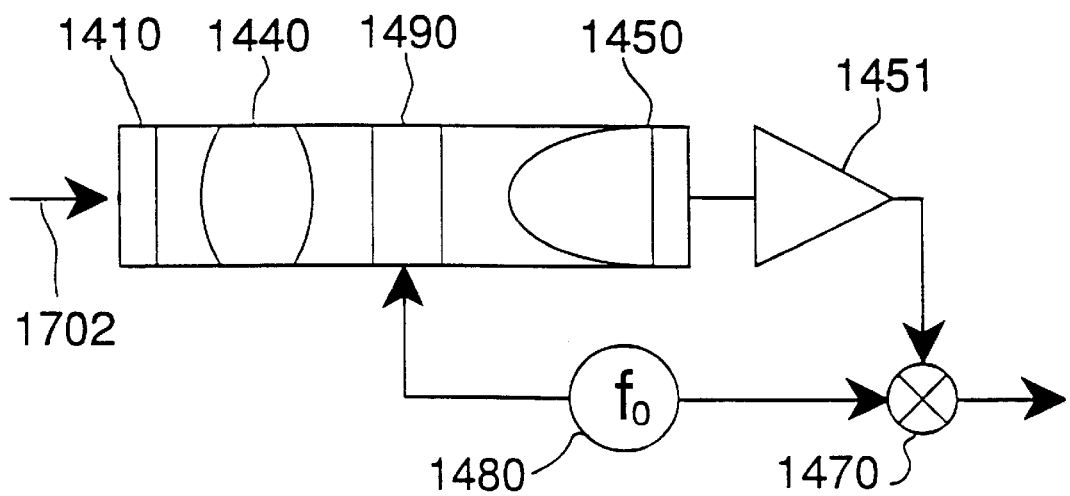
FIG. 18a shows an improved light scope which detects light with lock-in technique
Figure 18B:
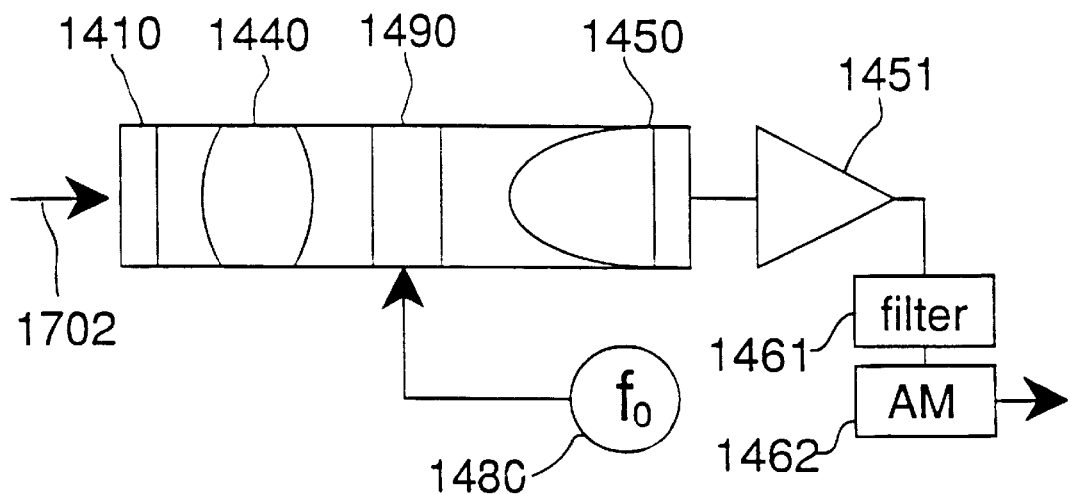
FIG. 18b shows an improved light scope which detects light with AM-detection technique

The sensitivity of a light scope can be improved by modulating the intensity of the light before it enters the light detecting means 1450. An improved light scope is shown in FIG. 18a and FIG. 18b. A conventional light scope consists of a lens system 1440 which defines a narrow field of view, a light detecting means 1450 to detect the incoming light signal, a signal amplifier 1451 to amplifying the signal from the light detecting means and possibly a band pass filter 1410. The improved light scope has an additional photo modulator 1490. When the modulator 1490 is driven with a periodic modulation signal with frequency $f_0$, a constant light signal passing through the modulator 1490 will become periodic in light intensity with the same modulation frequency $f_0$. The modulated light signal detected by the light detecting means 1450 will induce a periodic electric signal with the same frequency $f_0$ at the output of the signal amplifier 1451.

There are two methods to detect the periodic electric signal at the output of the amplifier 1451. FIG. 18a shows the first method, in which the periodic electric signal at the output of the amplifier 1451 is lock-in detected by a lock-in detector 1470 by using the driving signal for the light modulator 1490 as the reference signal. The electric signal S(t) at the output of the lock-in amplifier 1470 is proportional to the intensity of the light signal entering the light scope 1400. FIG. 18b shows the second method, in which the periodic electric signal at the output of the amplifier 1451 is sent into a band pass filter 1461 with frequency pass band centered around $f_0$. The filleted signal from the band pass filter 1461 is sent to an AM amplitude detector 1462. The signal S(t) from the output of the AM amplitude detector 1462 is proportional to the amplitude of the input electric signal with frequency $f_0$, and thus proportional to the intensity of the light signal entering the light scope 1400.

There are many types of light modulators which can be used as the light modulator 1490. If a light scope use timing information to determine both x and y coordinates of the sensing area 1430, a high frequency light modulator is required. If both x and y coordinates are determined by the timing information, the light modulator 1490 usually has to be able to modulate at frequencies exceeding a few MHz. If only the y coordinate is determined by the timing information, the light modulator 1490 usually has to be able to modulate at frequencies exceeding tens of kHz. If both x and y coordinates are determined by the intensity information, then, the light modulator 1490 usually only need to be able to modulate at frequencies exceeding hundreds of Hz. Thus, cheaper light modulator can be used, when both x and y coordinates are determined by the intensity information.

Figure 18C:
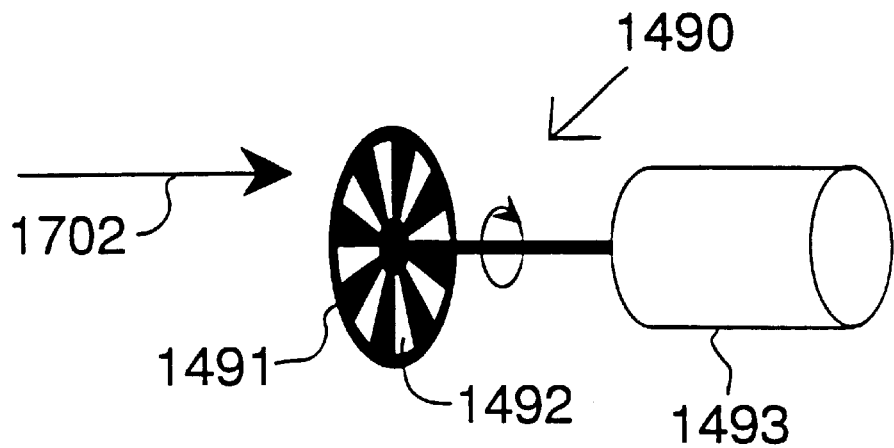
FIG. 18c shows that the light is modulated with a rotating wheel.
Figure 18D:
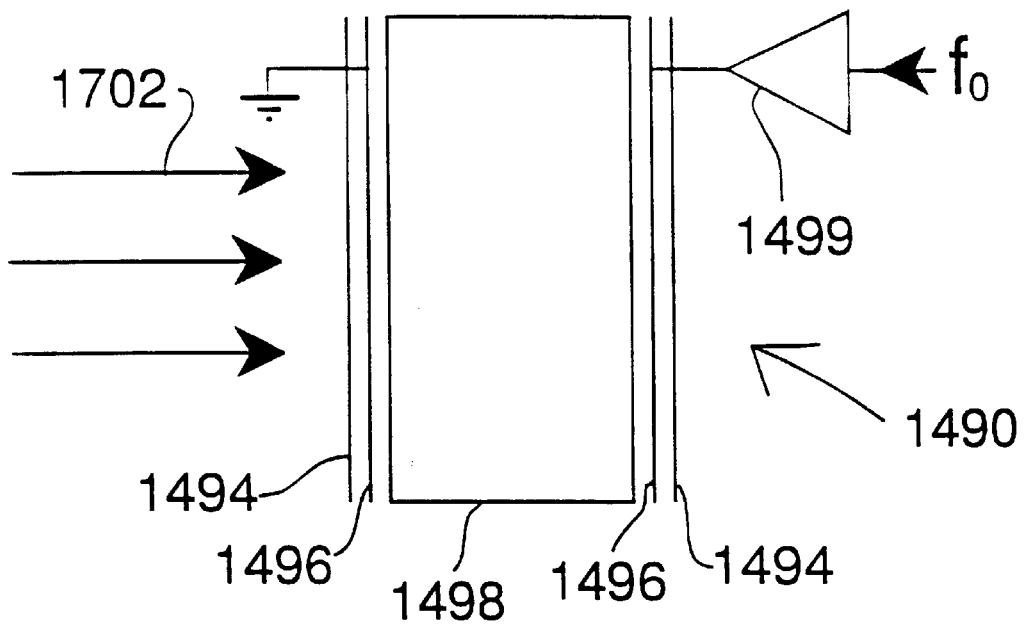
FIG. 18d shows that the light is modulated with a liquid crystal light valve.

FIG. 18c shows the simplest kind of light modulator, which consists of a rotating wheel 1491 with equally spaced slots 1492 on the wheel and driven by a motor 1493. If the wheel has N slots and rotates M turns in a second, then, the modulation frequency in unit of Hz is given by $f_0$=NM. FIG. 18d shows another kind of light modulator 1490 which is based on liquid crystal light valves. The light modulator 1490 consists of a liquid crystal light valve (having component 1498, polarizes 1496, transparent conducting plate 1494)and voltage driver 1499. The incoming light can be modulated by a modulation voltage applied to the input of the voltage driver 1499. If the intensity of the incoming light signal is a constant, then, the modulated output light signal will have the same kind of wave form as the voltage applied to the input of the voltage driver 1499. Other kinds of light modulator can be chosen by the people skilled in the art.

APPLICATIONS OF THE INVENTION

In the above, the remote pointing device that can directly control the position of the cursor 10 on the display means 20 by using the pointing means 40 is described. One advantage for all the above embodiments, which should be pointed out, is that the position on the display means 20 pointed by the pointing means 40 need not to be determined very accurately, since that position is only nominally represented by the cursor position 10. This advantage enables the remote pointing device to be made cheaply for the home market. For example, in the general embodiment described above, cheap three dimensional digitizers can be used as the measurement apparatus 990. In the following, six applications of using the remote pointing device is described. The first three applications has already been described in the original application, and additional three applications are newly described in this Continuation-In-Part application.

The first application is to provide a simplified remote control to replace the mouse as the input device for computers or interactive TVs. The simplified remote control consists of a remote pointing device described in this invention, and a small number of control buttons like that in a mouse. The remote pouting device on the simplified remote control enables a user to directly position a cursor on a screen by simply pointing at the position. And based on the graphic user interface displayed on the screen, the simplified remote control enables an user to interactive with a computer or an interactive TV effectively, with a few buttons and by simple actions like "point and click". This simplified remote control can be used as the one button (maybe two or three) ultimate remote control for interactive TVs that is envisioned by the expert in the filed (Thomas E. Weber, p. R10, Mar. 21, 1994, *Wall Street Journal*.).

Figure 11A:
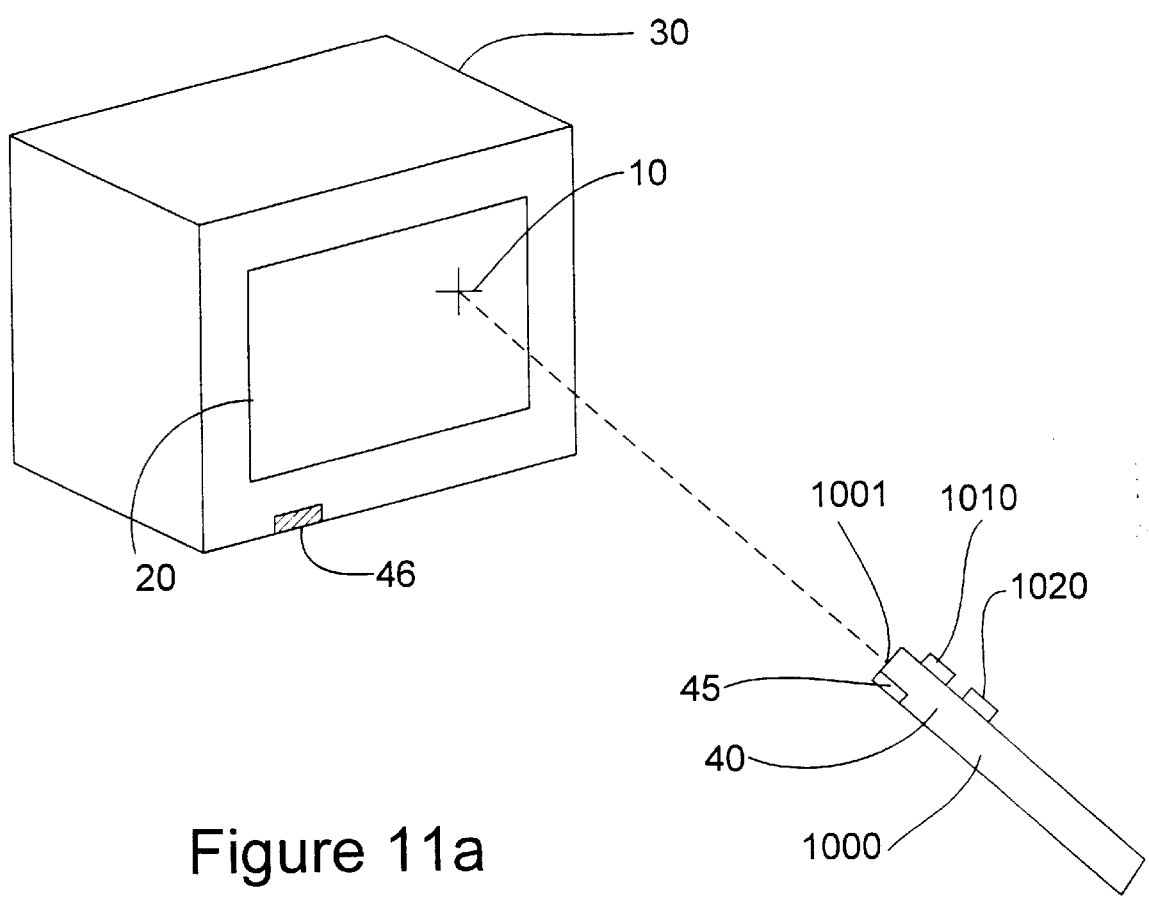
FIG. 11b shows a two button ultimate remote control.
FIG. 11c shows that the cursor position on display means is directly controlled by the head movement of an user wearing a helmet with pointing means.
FIG. 11d shows that a remote pointer is used as a direct replacement for a mouse.
FIG. 11e shows that a remote pointer is used for a long range touch screen with the touching finger emulated by a visible light beam.
FIG. 11f shows that a remote pointer is used with a game gun.

FIG. 11a shows a two buttons ultimate remote control. The remote control 1005 consists of a pointing means 40, a power button 1010, and a selection button 1020. The pointing means 40 is used to control directly the position of the cursor 10 on the display means 20. The power button 1010 is used turn on and off the interactive TV or computer 30 remotely with electromagnetic or infrared waves. The selection button 1020 works similar to the selection button on a mouse, which is used for "pick", "drag", "click", and "double click" actions. These actions of the selection button 1020 is coded and transmitted to the interactive TV or computer 30 remotely by Infrared or electromagnetic waves. The selection button 1020 can also perform pointer enable function for saving the battery on the remote control. For, example, if a light source 1001 is used on the remote control 1000, the first press of the selection button 1020 will turn on the light source 1001, and subsequent pressing and releasing of the select button 1020 will perform the normal select functions; if no action is used on the selection buttons 1020 for a long period of time, say, one minute, the light source 1001 will be automatically turned off to save energy, and the next press of the selection button 1020 will turn on the light source first and perform normal selection functions thereafter. The remote pointer enabling function can be achieved by a separate button than the selection button 1020, and in this case we have a three buttons ultimate remote control. There can also have two selection buttons like that on a Microsoft mouse, or three selection buttons like that on a Sun mouse, or more than three selection buttons. If other commonly used function buttons—such as channel up and down, volume up and down, or mute—are also added to the ultimate remote control, then, the ultimate remote control becomes closer to the conventional remote control. The actions of all buttons are coded either with electromagnetic waves or infrared waves. The coded signal is transmitted into the computer 30 through a transmitter 45 on the pointing means and a receiver 46 on the computer 30.

Figure 11B:
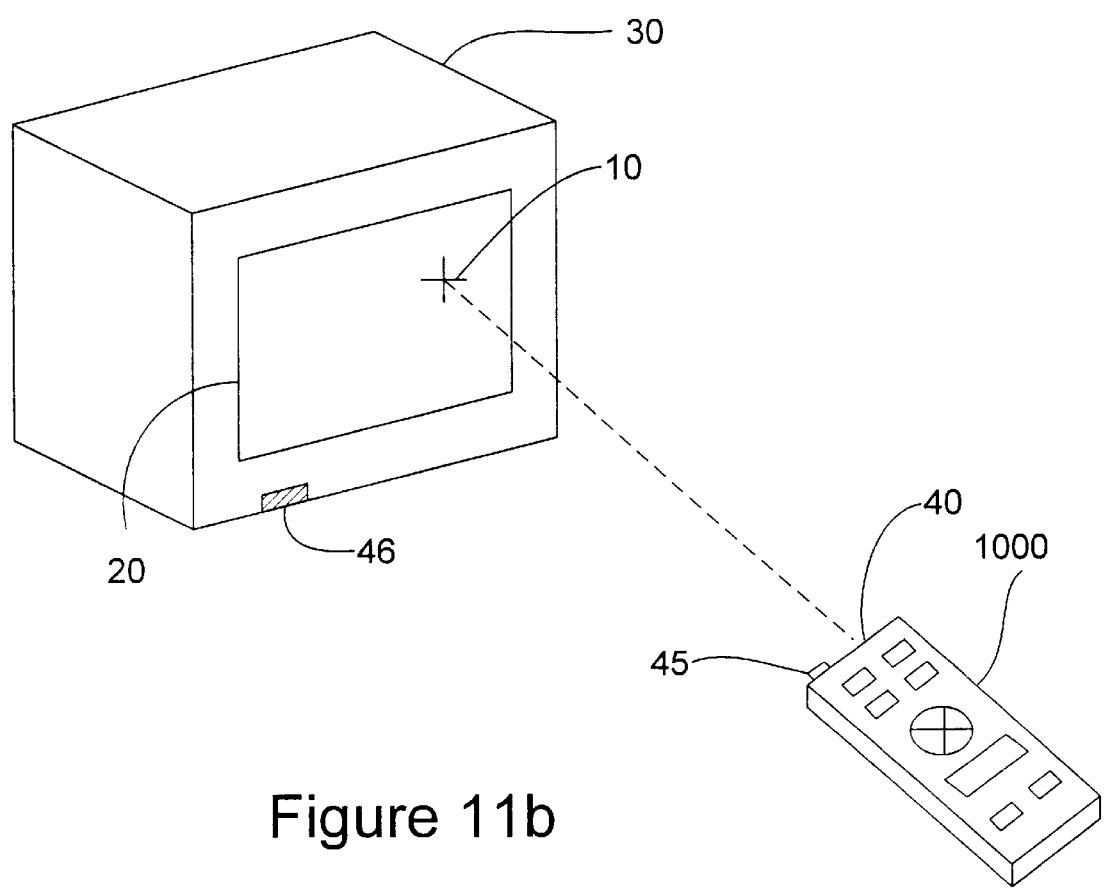

The second application is to provide an improved remote control for interactive TVs. Even though the commonly used conventional remote controls for the one way TV or other home electronics is no longer adequate for the interactive TVs or interactive home electronics, these remote controls can be greatly improved by adding pointing means to the remote control and using the pointing means to control directly the cursor on the screen of the interactive electronics. The embodiment of this improved remote control is illustrated in FIG. 11b. As shown in FIG. 11b, a microprocessor based home appliance 30, which can be either an interactive TV or other interactive home electronics, has display means 20, and there is a cursor 10 on the display means 20. Pointing means 40 is added to a conventional remote control 1000 used for home electronics. The conventional remote control has control buttons and selection buttons coded with either infrared or electromagnetic waves. The pointing means 40 enable an user to control the position of the cursor 10 on the screen intuitively: the position on the display means 20 pointed by the pointing means 40 is the position of the cursor 10. This enable an user to interact comfortably with the interactive home electronics in most of the home environment: in a living room, a bedroom or a kitchen. The methods of how to construct the pouting means 40 and the methods of how to input into the computer the position pointed by the pointing means 40 as the position of the cursor 10 have already been described in detail and is not repeated.

Figure 11C:
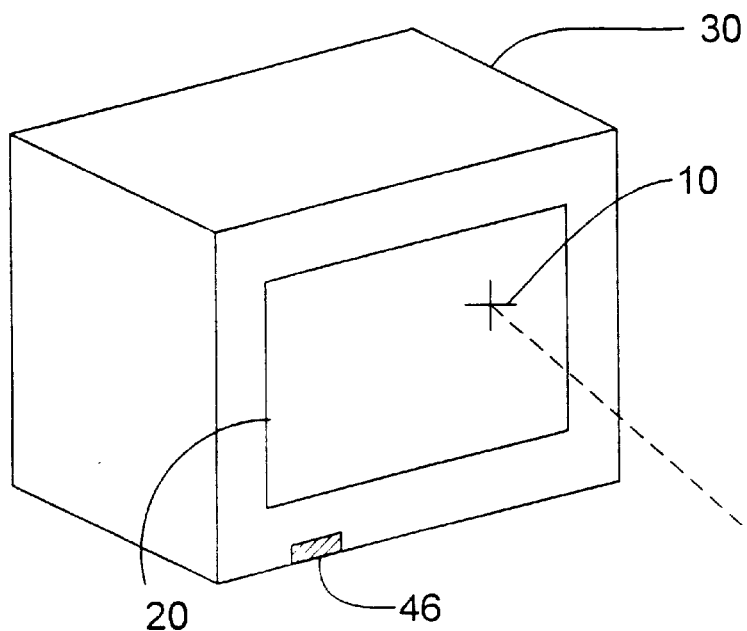
Figure 11C:
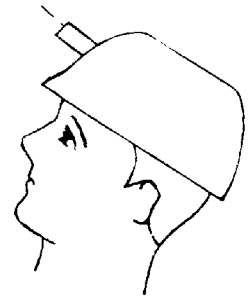

The third application is to provide a remote pointing device that can be beneficial to the handicapped. One embodiment of this application is illustrated in FIG. 11c. FIG. 11c shows that the pointing device 40 is fixed on a helmet 1050. Wearing the helmet 1050 enables an user to control the position of the cursor 10 with head movement. If the action of control buttons is voice activated, the user wearing the helmet 1050, then, can interact effectively with the computer or interactive TV without using any of his or her hands. This method of interacting with a computer can be beneficial to the handicapped; it can also be used by astronauts or other workers in a situation that their hands are occupied and can not be used to control computers. The pointing device can also be fixed on a pair of glasses. Furthermore, if the pointing device is fixed on the body of an user, the user can interact with computers by body movement. These methods of using the remote pointing device by fixing it on a part of body can also be used by non handicapped people, for example, the remote pointing device can be fixed on a ring wearing on one of the fingers of an user to provide a convenient interface with a computer.

Figure 11D:
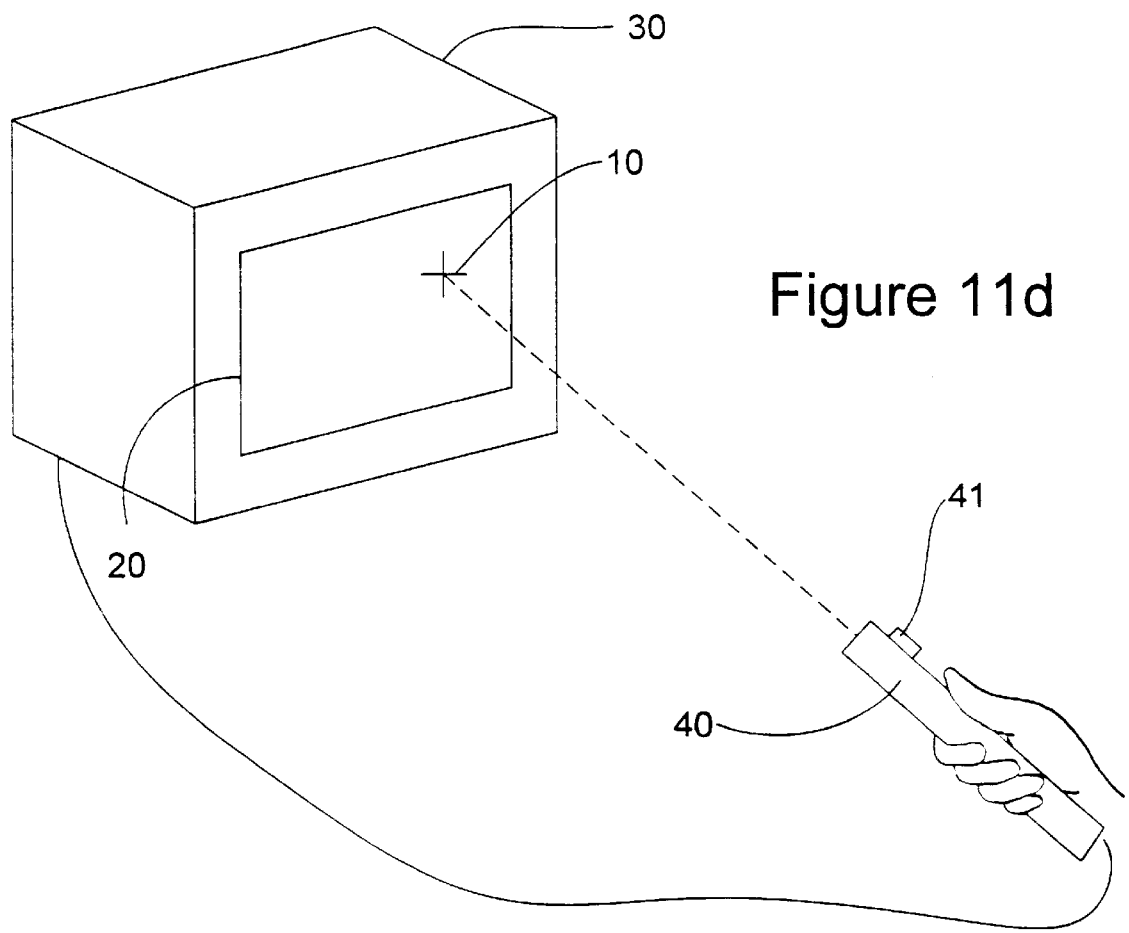

The fourth application is to provide a new pointing device which is more ergomatic than a mouse for desk top computers. When a computer is used as an interactive terminal for a cyber-space, such as the Internet, a computer user becomes more and more depend on a good cursor control device, for reading interactive newspapers, watching interactive TVs, and doing home shopping et al. At present, the most commonly used cursor control device is still a mouse, but present invention of the remote pointer provides a better cursor control device than a mouse. The remote pointer is more ergomatic than a mouse: Users don't have to restrict their hands on the table top, and they can lay back on a chair and can still control the cursor position easily. The remote pointer is more effective, more intuitive and faster in controlling a cursor than a mouse. For this application, the remote pointer consists of pointing means 40 and selection button(s) 41, as shown in FIG. 11d. There are two methods to use the remote pointer for desk top computers. In the first method, the remote pointer is not tied with wires, and the actions of selection buttons are input into the computer remotely through coded infrared or electromagnetic waves; it is also self powered by a battery. The remote pointer is used the same way as the ultimate remote control in the previous description of the first application. In the second method, the remote pointer is tied with wires, and the actions of selection button(s) 41 are input into computer through a cable 49; the remote pointer is either self powered or drawing its power from the computer system, as shown in Fig. 11d.

Figure 11E:
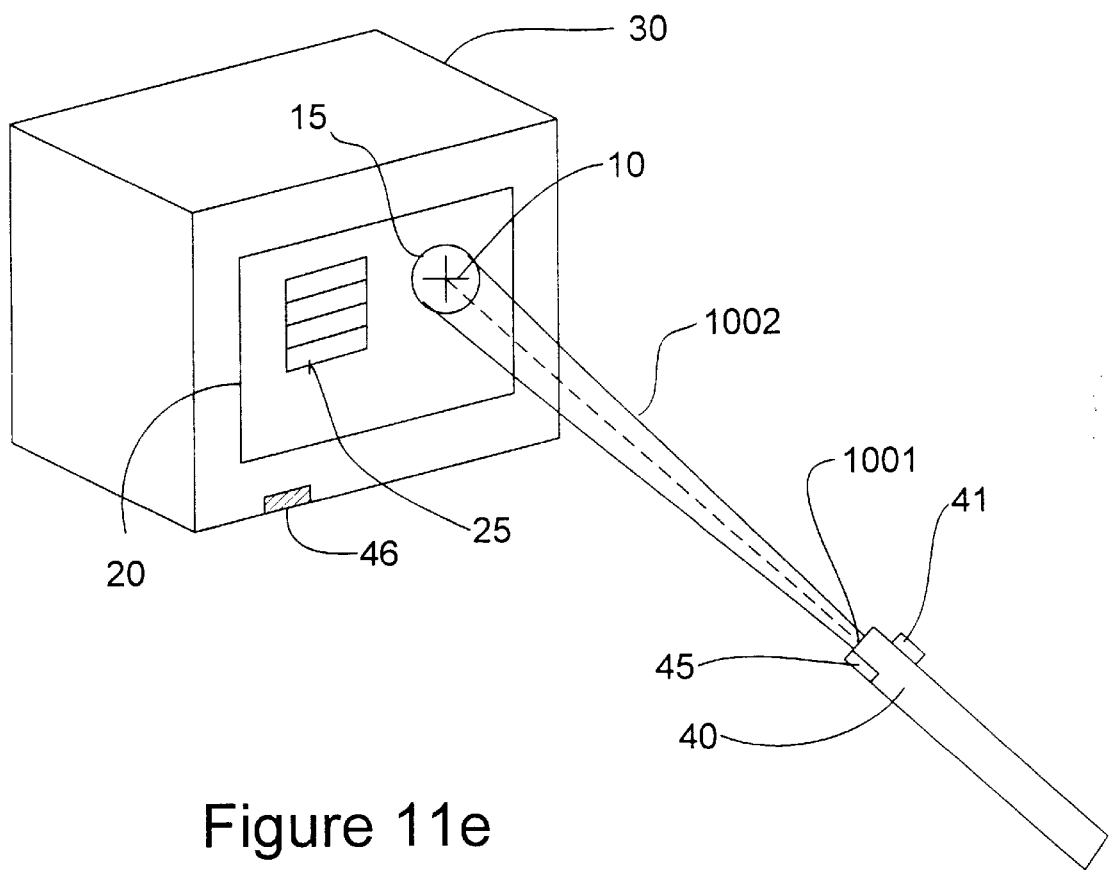

The fifth application is to use the remote pointer for a remote touch screen. Conventional touch screen use a finger or an object to issue commands to a computer. When the command displayed on the touch screen is touched by a finger or an object, the command is inputted into the computer. As shown in FIG. 11e, a remote touch screen consists of a display means 20, displayed areas of command 25, a remote pointer 40, selection button(s) 41, and a visible light source 1001 projecting a beam of light 1002 in the same direction pointed by the pointing means 40. In this application, no cursor is displayed as in all previous applications. The position on the display means 20 pointed by the pointing means 40 is determined using the methods disclosed in the current invention, and is inputted into the computer 30 wirelessly through transmitter 45 and receiver 46. But the position pointed by the display means 40 is not displayed as a cursor, instead, that position is directly indicated by the visible light spot 15 projected from the pointing means 40. The visible light beam 1002 is used to emulate a "long finger", and the visible light spot 15 is used to emulate the touching spot on the screen. The touching action is emulated by the press of the selection button 41. When the selection button 41 is pressed, the command indicated by the light spot 15 will be issued to the computer 30. Thus, the screen can be effectively touched from a distance, and it is also possible that the screen be effectively touched by several users if each of them has a remote pointer.

Figure 11F:
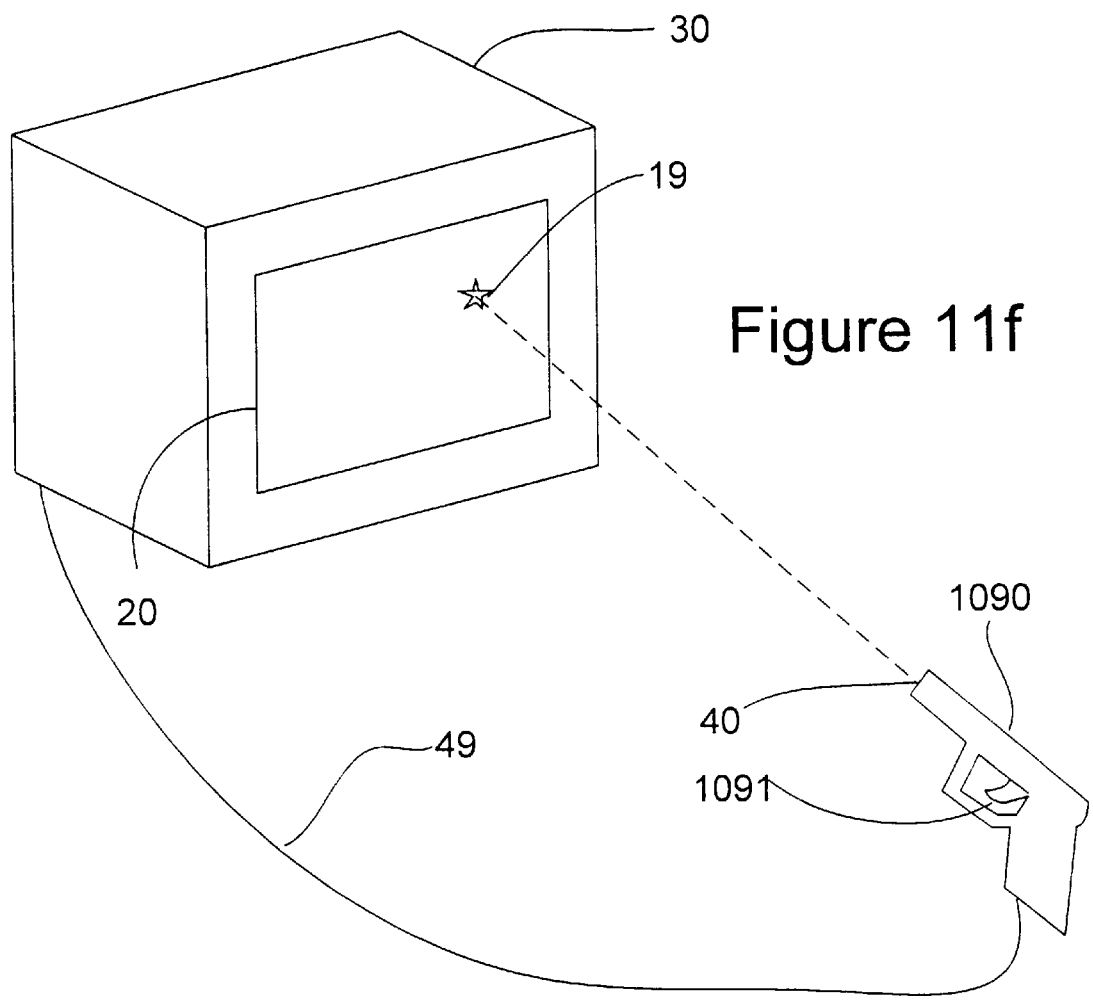

The six application is to provide cheaper and better ways of making game guns for video games. As shown in FIG. 11f, a game gun 1090 consists of pointing means 40 and a trigger 1091. In all pervious applications, when a remote pointer is used as a cursor control device, the position on the display means 20 pointed by the pointing means 40 is determined and input into the computer 30, and the position pointed by the pointing means 40 is always displayed as the position of the cursor 10. In this application, however, when a remote pointer is used as the pointing means for a game gun, the position on the display means 20 pointed by the pointing means 40 is determined and input into the computer, but the position pointed by the pointing means 40 is not displayed; the position pointed by the pointing means 40 is displayed only when the trigger 1091 on the game gun 1990 is triggered, and is used to emulate the impact of a bullet 19, as shown in FIG. 11f. At present, most game guns use a light scope to determine the position on the display means 20 pointed by the pointing means 40. All the embodiments, disclosed in the current invention, of determining the position on the display means 20 pointed by the pointing means 40, may proved alternatives for a game gun, and some of the methods may be better and cheaper than a light scope. In particular, the optical embodiments of using invisible light and light imaging means provides a better way to make a game gun than a light scope. Because a light scope has the well recognized problem that it can not pick up dark spots.

The forgoing description of selected embodiments and applications has been presented for purpose of illustration. It is not intended to be exhaustive or to limit the invention to the precise form described, and obviously many modifications and variations are possible in the light of the above teaching. The embodiments and applications described above was chosen in order to explain most clearly the principles of the invention and its practical application thereby to enable others in the art to utilize most effectively the invention in various embodiments and with various modifications as are suited to the particular use contemplated. For example, the remote pointing device can be used as input devices for business presentation; it can also be used as a remote drawing device on a large display screen for conferences or demonstrations. Accordingly, the scope of the invention should be determined not by the embodiments illustrated, but by the appended claims and their legal equivalents.

I claim:

1. An improved remote control to provide easy interface between a human user and a television having a cursor displayed on the television screen, comprising:

a remote control;

a conventional control button fixed on said remote control, and the function of said conventional control button being independent of where the cursor appears on the television screen, and said conventional control button being used to perform a frequently used television control function selecting from a group consisting of volume up, volume down, channel up, channel down, power on and off, and mute;

a light scope having a lens for defining a narrow filed of view and a photo detector for detecting the light signal passing through the lens, and said light scope being fixed on said remote control and having the narrow filed of view defined by the lens aligned in the same direction as pointed by said remote control;

electronic circuitry for using the light signal measured by the photo detector in said light scope to determine the position on the television screen pointed by said remote control, whereby the television can display the cursor at the position on the television screen pointed by said remote control; and an unconventional control button fixed on said remote control, and the function of said unconventional control button being depend on where said cursor appear on the television screen;

whereby the human user can easily and intuitively control the cursor position on the television screen from a distance and also perform conventional remote control functions at the same time.

\* \* \* \* \*